(12) United States Patent
Oami

(10) Patent No.: US 8,352,471 B2
(45) Date of Patent: Jan. 8, 2013

(54) PHOTOGRAPH GROUPING DEVICE, PHOTOGRAPH GROUPING METHOD AND PHOTOGRAPH GROUPING PROGRAM

(75) Inventor: Ryoma Oami, Minato-ku (JP)

(73) Assignee: NEC Corporation, Tokyo (JP)

( * ) Notice: Subject to any disclaimer, the term of this patent is extended or adjusted under 35 U.S.C. 154(b) by 174 days.

(21) Appl. No.: 12/595,481

(22) PCT Filed: Nov. 4, 2008

(86) PCT No.: PCT/JP2008/057175
§ 371 (c)(1),
(2), (4) Date: Oct. 9, 2009

(87) PCT Pub. No.: WO2008/133046
PCT Pub. Date: Nov. 6, 2008

(65) Prior Publication Data
US 2010/0114891 A1    May 6, 2010

(30) Foreign Application Priority Data
Apr. 13, 2007    (JP) .................................. 2007-106004

(51) Int. Cl.
*G06F 17/30* (2006.01)
(52) U.S. Cl. ....................................................... 707/737
(58) Field of Classification Search .................. 707/737; 382/224
See application file for complete search history.

(56) References Cited

U.S. PATENT DOCUMENTS

| 6,606,411 | B1 | 8/2003 | Loui et al. | |
|---|---|---|---|---|
| 7,970,240 | B1 * | 6/2011 | Chao et al. | 382/305 |
| 2002/0007364 | A1 | 1/2002 | Kobayashi et al. | |
| 2005/0278111 | A1 | 12/2005 | Ujino | |

FOREIGN PATENT DOCUMENTS

| JP | 8-335034 A | 12/1996 |
|---|---|---|
| JP | 2000-112997 A | 4/2000 |
| JP | 2001-312505 A | 11/2001 |
| JP | 2003-58867 A | 2/2003 |
| JP | 2003-141130 A | 5/2003 |
| JP | 2004-355493 A | 12/2004 |
| JP | 2005-107867 A | 4/2005 |
| JP | 2006-85588 A | 3/2006 |
| JP | 200794762 A | 4/2007 |

OTHER PUBLICATIONS

John C. Platt et al., "PhotoTOC: Automatic Clustering for Browsing Personal Photographs", Dec. 1, 2003.
Office Action dated Aug. 31, 2012 issued by the Japanese Patent Office in counterpart Japanese Application No. 2009-511781.

* cited by examiner

*Primary Examiner* — Wilson Lee
*Assistant Examiner* — Alexander Khong
(74) *Attorney, Agent, or Firm* — Sughrue Mion, PLLC

(57) ABSTRACT

The proximate data selecting unit (photographing time distance base proximate data selecting unit) selects, as a proximate photograph, a photograph having a photographing time satisfying constraint on a time distance from a determination time determined in each adjacent photographs block as a time block sandwiched by photographing times of two photographs adjacent to each other in a group of photographs aligned in the order of photographing based on time series photographing time information and outputs proximate data designation information for designating photographing time data of the proximate photograph. The group boundary determining unit detects a change of a photographing disposition in each adjacent photographs block by using photographing time data of a proximate photograph at a determination time in each adjacent photographs block which is designated by the proximate data designation information, thereby determining whether there exists a boundary of a group in each adjacent photographs block.

41 Claims, 6 Drawing Sheets

PHOTOGRAPH GROUPING DEVICE, PHOTOGRAPH GROUPING METHOD AND PHOTOGRAPH GROUPING PROGRAM

TECHNICAL FIELD

The present invention relates to a photograph grouping device, a photograph grouping method and a photograph grouping program which are for grouping photographs taken by a digital camera, a mobile terminal with a camera or the like and, more particularly, to a photograph grouping device, a photograph grouping method and a photograph grouping program for grouping photographs along a time base of time when a photograph is taken.

BACKGROUND ART

With a photograph grouping device of this kind, photographs are managed by grouping on a photographing time and date basis or when a time interval between successively taken photographs exceeds a fixed threshold value, by putting photographs into different groups (e.g. Patent Literature 1).

FIG. 19 is a block diagram showing an example of a structure of a photograph grouping device which groups photographs by subjecting a time interval of photographing times to threshold processing as recited in Patent Literature 1. The photograph grouping device shown in FIG. 19 comprises an adjacent photographs block photographing time interval calculating unit 901 and a time interval threshold processing unit 902. With time series photographing time information indicative of photographing time of each photograph taken in time series as an input, the adjacent photographs block photographing time interval calculating unit 901 transfers time series photographing time interval information indicative of a photographing time interval between respective photographs aligned in time series to the time interval threshold processing unit 902. With the time series photographing time interval information output from the adjacent photographs block photographing time interval calculating unit 901 as an input, the time interval threshold processing unit 902 outputs group boundary position information indicative of a position of a group boundary in a group of photographs to be grouped.

Next, operation of the photograph grouping device shown in FIG. 19 will be described. To the adjacent photographs block photographing time interval calculating unit 901, time series photographing time information as photographing time data of photographs taken in time series which is extracted from photographs or related information attached thereto is input in the order of photographing time. Since it is a common practice that photographing time data is stored within a photograph in the Exif format, reading the information obtains time series photographing time information.

The adjacent photographs block photographing time interval calculating unit 901 calculates a difference between photographing times of photographs adjacent to each other in time from the applied time series photographing time information. More specifically, with the total number of photographs input as N and photographing time of an i-th photograph as T(i), execute the following Expression (1) with respect to each i (i=1, ..., N−1) to output an obtained time interval d(i) (i=1, ..., N−1) as time series photographing time interval information to the time interval threshold processing unit 902.

$$d(i)=T(i+1)-T(i) \qquad \text{Expression (1)}$$

The time interval threshold processing unit 902 compares the applied time series photographing time interval information with a fixed threshold value and when the time interval exceeds the threshold value, identifies its position as a group boundary. More specifically, with the threshold value as TH, execute the following Expression (2) with respect to each time interval d(i) (i=1, ..., N−1) to identify i satisfying the Expression (2) as a group boundary, that is, determine that a break-point of the group exists between the i-th photograph and the (i+1)th photograph. The time interval threshold processing unit 902 obtains all i satisfying the Expression (2) and outputs the same as group boundary information.

$$d(i)>TH \qquad \text{Expression (2)}$$

While in the above-described example, the threshold value TH for use in dividing an event is fixed, disclosed in Non-Patent Literature 1 is the method of dynamically changing a value of a threshold according to a fixed number of preceding and succeeding photographing time intervals to group photographs.

FIG. 20 is a block diagram showing an example of a structure of a photograph grouping device which groups photographs by dynamically changing a threshold value to subject a time interval of a photographing time to the threshold processing as recited in Non-Patent Literature 1. The photograph grouping device shown in FIG. 20 comprises the adjacent photographs block photographing time interval calculating unit 901, the time interval threshold processing unit 902, a fixed number of photographing time interval data selecting unit 911 and a threshold value determining unit 912.

In the example shown in FIG. 20, with time series photographing time information as an input, the adjacent photographs block photographing time interval calculating unit 901 outputs time series photographing time interval information to the fixed number of photographing time interval data selecting unit 911 and the time interval threshold processing unit 902. With the time series photographing time interval information output from the adjacent photographs block photographing time interval calculating unit 901 as an input, the fixed number of photographing time interval data selecting unit 911 outputs a fixed number of pieces of photographing time interval data to the threshold value determining unit 912. With the fixed number of pieces of photographing time interval data output from the fixed number of photographing time interval data selecting unit 911 as an input, the threshold value determining unit 912 outputs a threshold value to the time interval threshold processing unit 902. With the time series photographing time interval information output from the adjacent photographs block photographing time interval calculating unit 901 and the threshold value output from the threshold value determining unit 912 as inputs, the time interval threshold processing unit 902 outputs group boundary position information.

Next, operation of the photograph grouping device shown in FIG. 20 will be described. When time series photographing time information is input, the adjacent photographs block photographing time interval calculating unit 901 calculates a difference between photographing times of photographs adjacent to each other in time to output time series photographing time interval information similarly to the example shown in FIG. 19.

The fixed number of photographing time interval data selecting unit 911 selects a fixed number of photographing time intervals preceding to and succeeding a time interval to be processed. More specifically, when a k-th time interval d(k) is to be processed, with a fixed number as w, select the number w of preceding and the number w of succeeding time intervals d(k−w), d(k−w+1), d(k), d(k+1), d(k+w). The selected time intervals are output as the fixed number of pieces of photographing time interval data to the threshold value determining unit 912.

The threshold value determining unit 912 calculates a threshold value TH(k) for use in the threshold processing of d(k) to be processed from the fixed number of pieces of photographing time interval data. More specifically, calculation will be made by using the following Expression (3). Here, K is a constant, and experimentally K is set to be log(17). The obtained threshold value TH(k) is output to the time interval threshold processing unit 902.

(FORMULA 1)

$$TH(k) = \exp\left(K + \frac{1}{2w+1} \sum_{i=-w}^{w} \log(d(k+i))\right) \quad \text{Expression(3)}$$

Operation of the time interval threshold processing unit 902 is the same as that of the example shown in FIG. 19. Threshold value used is not fixed but changed according to each (i=1, . . . , N−1). In the threshold processing of d(k), for example, the threshold value TH(k) output from the threshold value determining unit 912 is used.

Patent Literature 1: Japanese Patent Laying-Open No. 2004-355493.

Non-Patent Literature 2: J. C. Platt, M. Czerwinski, B. A. Field, "Photo TOC: Automatic Clustering for Browsing Personal Photographs", Proceedings of the 2003 Joint Conference on International Conference on Information, Communication and Signal Processing and Pacific Rim Conference on Multimedia, 2003, Vol. 1, pp. 6-10.

Use of the photograph grouping devices shown in FIG. 19 and FIG. 20 enables time series photographs to be grouped. There exists, however, a case where a precision in grouping (division precision) might be degraded. Among factors of degradation in division precision are as follows.

The first problem is that such division by a fixed threshold value as shown in FIG. 19 makes it extremely difficult to determine a threshold value which realizes highly precise grouping. The reason is that a fixed threshold value fails to sufficiently reflect a change of a character of an object or an event to be photographed and a user's photographing disposition. When a threshold value is determined based on an event in which photographs are sparsely taken, for example, there occurs a problem that finding a group boundary from a group of photographs of an event in which photographs are frequently taken will have a difficulty. Conversely, when a threshold value is determined based on an event in which photographs are frequently taken, for example, there occurs a problem that a group of photographs of an event in which photographs are sparsely taken will be excessively divided. In addition, since the frequency of photographing largely depends on a photographer's photographing disposition, it is highly possible that a threshold value determined reflecting a disposition of a specific person will not be appropriate for grouping photographs taken by others.

The second problem is that by such division by a threshold controlling method as shown in FIG. 20, when photographing times of photographs largely apart in time are included in a fixed number of pieces of photographing time interval data for use in determining a threshold value, the threshold value cannot be determined satisfactorily. The reason is that in a case of a photograph taken sparsely in time, a photographing time interval from a photograph largely apart in time might be included in the fixed number of pieces of photographing time interval data, so that a threshold value will be increased due to the effect of the largely apart photographing time interval, thereby degrading a division precision. Although photographs largely apart in time are fundamentally not related with the contents of photographs to be grouped at present, when the photographs are within a range of a number (number of photographs) as a selection reference, it will nonetheless affect determination of a threshold value. If the number of photographs for use in determining a threshold value is reduced in order to avoid such a situation, because in the grouping of photographs of an event whose photographing frequency is high, only the proximate photographs will affect determination of a threshold value, a threshold value might be unstable.

Under these circumstances, an object of the present invention is to provide a photograph grouping device, a photograph grouping method and a photograph grouping program which enable photographs to be grouped with high precision even when a character of an event to be photographed or a user's photographing disposition varies.

SUMMARY

According to the present invention, with respect to each adjacent photographs block, based on a photographing time of a photograph satisfying a predetermined constraint on a time distance between one or a plurality of times in the adjacent photographs block and a photographing time, or on a photographing time interval between photographs satisfying the time distance constraint, a change of a photographing disposition in the adjacent photographs block is detected, so that within an arbitrary adjacent photographs block, a series of photographs which are likely to be related with the same event or object can be used for determination without omission caused by a limitation of the number of photographs. It is accordingly possible to group photographs with high precision without limiting a division range.

In addition, since a change of a photographing disposition can be detected without being affected by unrelated photograph data which are largely apart in time, photographs can be grouped with high precision even when they are taken sparsely.

EXEMPLARY EMBODIMENT

First Exemplary Embodiment

Figure 1:
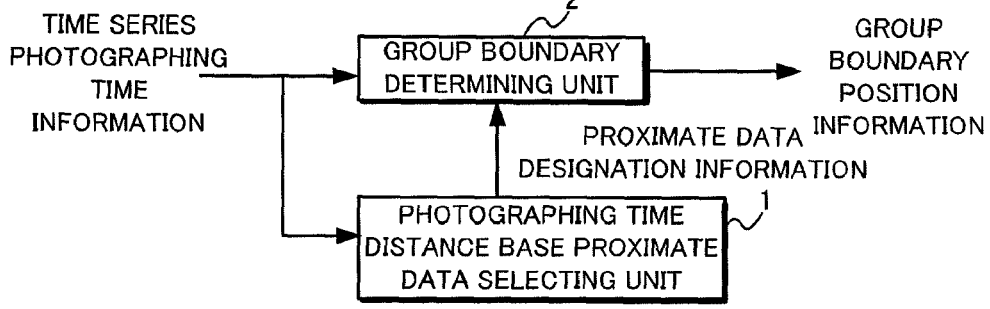
FIG. 1 is a block diagram showing an example of a structure of a photograph grouping device according to a first exemplary embodiment.

In the following, exemplary embodiments of the present invention will be detailed with reference to the drawings. FIG. 1 is a block diagram showing an example of a structure of a photograph grouping device according to a first exemplary embodiment of the present invention. The photograph grouping device shown in FIG. 1 comprises a photographing time distance base proximate data selecting unit 1 (hereinafter, simply referred to as the proximate data selecting unit 1) and a group boundary determining unit 2. With time series photographing time information indicative of a photographing time of each photograph included in a group of photographs aligned in the order of photographing as an input, the proximate data selecting unit 1 here outputs, to the group boundary determining unit 2, proximate data designation information which is information for designating photographing time data which satisfies constraint on a time distance from a determination time set in each adjacent photographs block (within a time sandwiched between photographing times of two adjacent photographs in a group of photographs to be grouped). With the time series photographing time information and the proximate data designation information output from the proximate data selecting unit 1 as inputs, the group boundary determining unit 2 outputs group boundary position information indicative of a position of a group boundary in a group of photographs to be grouped.

Time distance here represents a time interval (time width) between a certain time and a certain time. Position of a group boundary in a photograph group represents a break point as a boundary line of a group in an arrangement of the photograph group. Photographing time is time related to photographing, which may be not only time when a shutter is actually tripped but also any time counted at predetermined timing in a series of processes from when a photograph is taken until when its image data is preserved, for example, time when an image of an object is generated on a sensor, time when image data for preservation is generated by executing compression such as JPEG or image correction after generation of an object's image, in such a case of a cellular phone where a user is allowed to select preservation/non-preservation of data after photographing, time when the user designates preservation and in a case where a photograph is transferred to another apparatus such as a server after photographing, its transfer time. Time series photographing time information can be obtained from, for example, Exif information correlated with each photograph. The information can be also obtained from meta data stored in a meta data description format of describing equivalent content such as MPEG-7, MPEG-A Part 3 or the like.

With respect to each adjacent photographs block, the proximate data selecting unit 1 selects a photograph having a photographing time which satisfies constraint on a time distance from a certain time determined in the adjacent photographs block as a proximate photograph block for use in determining whether a group boundary exists or not based on the time series photographing time information and outputs the proximate data designation information for designating photographing time data of the proximate photograph to the group boundary determining unit 2. In the following, time to be a reference for selecting a proximate photograph will be referred to as a determination time. In the present exemplary embodiment, the proximate data selecting unit 1 selects photographing time data of a photograph indicating a photographing time which satisfies constraint on a time distance from a determination time provided in each adjacent photographs block as proximate data from the time series photographing time information and outputs proximate data designation information which designates the proximate data, thereby designating a proximate photograph for the group boundary determining unit 2.

Using photographing time data (proximate data) of a proximate photograph at a determination time in each adjacent photographs block designated by the proximate data designation information, the group boundary determining unit 2 detects a change of a photographing disposition in each adjacent photographs block and determines whether there exists a group boundary in each adjacent photographs block according to the detection result to determine a group boundary in a group of photographs to be grouped.

In the present exemplary embodiment, the proximate data selecting unit 1 and the group boundary determining unit 2 are realized, for example, by a data processing device such as a CPU operable according to a program.

Figure 2:
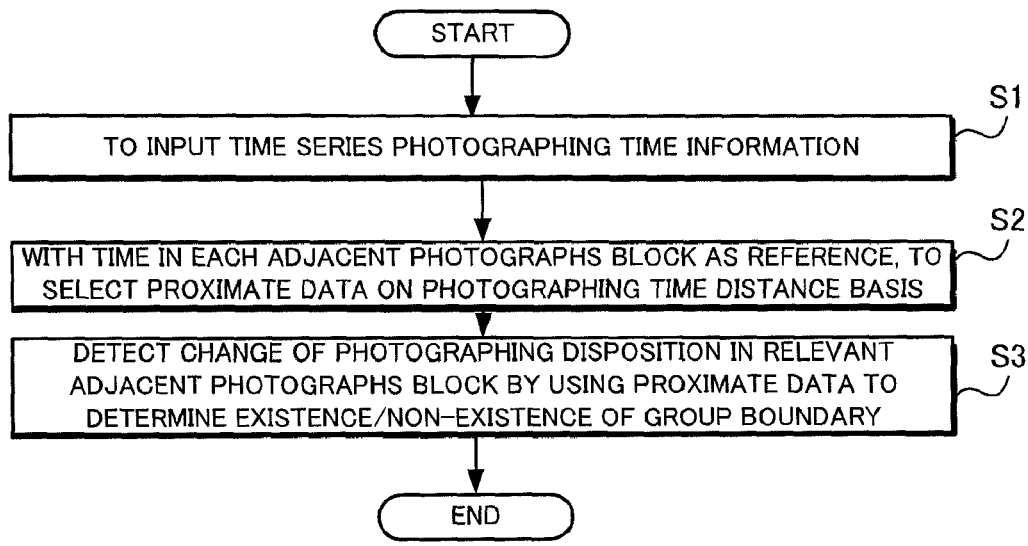
FIG. 2 is a flow chart showing an example of operation of the photograph grouping device.

Next, operation of the present exemplary embodiment will be described. FIG. 2 is a flow chart showing an example of operation of the photograph grouping device according to the present exemplary embodiment. As shown in FIG. 2, first, the proximate data selecting unit 1 receives input of the time series photographing time information (Step S1). The proximate data selecting unit 1 may receive input of the time series photographing time information which indicates photographing time data of each photograph in the order of photographing by obtaining (referring to) photographing time data from, for example, Exif information accompanying image data of a photograph designated as a grouping target which is aligned in the order of photographing. When the time series photographing time information is input, with a photograph taken at time satisfying constraint on a time distance from a determination time determined in each adjacent photographs block as a proximate photograph, the photographing time base proximate data selecting unit 1 selects photographing time data of the proximate photograph as proximate data as of the determination time (Step S2). Proximate data is used as sample data for detecting a photographing disposition changing or not between two photographs taken at a time with the determination time sandwiched therebetween.

Assume, for example, that the total number of photographs input is represented as N and a photographing time of an i-th photograph is represented as $T(i)$, the proximate data selecting unit 1, with respect to a block between j-th and (j+1)th adjacent photographs, may select the determination time T satisfying the following Expression (4) to select photographing time data indicative of a photographing time $T(i)$ whose time distance from the determination time T satisfies certain fixed constraint as proximate data.

(Formula 2)

$$T(j) \leq T \leq T(j+1) \qquad \text{Expression (4)}$$

Determination time T can be set at an arbitrary position in an adjacent photographs block. It is also possible to set a plurality of times in one adjacent photographs block. For example, a photographing time of an adjacent photograph itself may be considered as a determination time or a middle point obtained in an adjacent photographs block may be considered as a determination time. It is further possible to, for example, divide an adjacent photographs block by a certain fixed time width to consider a time of each division boundary as a determination time. When a plurality of determination times are set for one adjacent photographs block, each proximate data may be handled individually as proximate data at each determination time or proximate data at determination times set in the same adjacent photographs block may be combined and handled as proximate data in each adjacent photographs block.

Usable as constraint on a photographing time is, for example, a condition that a time distance from the determination time T is not more than a fixed time. Taking into consideration that an event such as a birthday party takes place yearly, a condition may be alternatively that an about one-year preceding photographing time is used in combination. In addition, it is not always necessary for proximate data to be selected from a range of photographs taken in succession and a condition may be adopted that taking into consideration that such an event as meal occurs in a time zone determined in advance, photographing times included in the same time zone (e.g. photographing times approximate to a multiple of 24 hours) are used in combination. Specific method of selecting proximate data will be described in detail in the description of a mode of implementing the proximate data selecting unit 1.

With respect, for example, to each determination time T (one or a plurality of determination times T set in each adjacent photographs block), the proximate data selecting unit 1 outputs proximate data designation information which designates selected proximate data to the group boundary determining unit 2. Proximate data designation information may be selected proximate data itself (photographing time data of a proximate photograph) or information indicative of an index value of a photograph selected as proximate data. In a case where successive photographs are selected as proximate photographs, the information may be an index value indicative of a range of selected photographs (e.g. a maximum value and a minimum value of an index of a selected photograph, either a maximum value or a minimum value and a selected number of photographs).

Then, using the proximate data as of the determination time in each adjacent photographs block designated by the proximate data selecting unit 1, the group boundary determining unit 2 detects a change of a photographing disposition in each adjacent photographs block to determine whether a group boundary exists in each adjacent photographs block according to the detection result (Step S3). For example, by using proximate data (i.e. photographing time data) as of each determination time indicated by the proximate data designation information, the group boundary determining unit 2 only needs to detect a photographing disposition changing or not changing before and after the determination time and when a change of the photographing disposition is detected, determine that a group boundary exists between two photographs taken at a time with the determination time sandwiched therebetween.

While among indexes for determining a change of a photographing disposition are a density of the number of photographing times, an average photographing interval and a photographing time interval, the index is not limited to those and any statistics that similarly reflect a photographing disposition can be used. Statistics combining those may be used for determination. Possible are, for example, statistics having weighted addition of the foregoing and statistics to be selectively used. Specific method of determining a change of a photographing disposition will be described in more detailed description of the group boundary determining unit 2.

According to a result of determination whether a group boundary exists in each adjacent photographs block or not, the group boundary determining unit 2 outputs group boundary position information indicative of a position of a group boundary in a group of photographs to be grouped. The group boundary determining unit 2 not only outputs group boundary position information indicative of a position of a group boundary but also takes such an output form that enables a user to recognize a position of a group boundary as distributing photographs to a folder on a group basis.

The photograph grouping device is also allowed to repeat grouping operation to have groups of other stages such as grouping photographs with a large time width as time distance constraint and further grouping the photographs classified into divisional groups with a small time width as time distance constraint.

As described in the foregoing, with respect to a determination time set in each adjacent photographs block, by determining whether a group boundary exists in an adjacent photographs block by using proximate data selected on a photographing time distance basis, a group boundary can be adaptively determined without being affected by photographing time data of an unrelated photograph whose photographing time is largely apart in time. In addition, since photographing time data of photographs proximate in time can be all designated as proximate data irrespectively of the number of photographs, it is possible to use a series of photographs related to the same event or object for determination, thereby discriminating a group boundary while more appropriately reflecting effects of a user's photographing disposition or a character of an event.

Since by selecting photographing time data of photographs existing in proximity in time as proximate data irrespectively of the number of photographs while excluding photographing time data of a photograph apart in time, photographs can be grouped with high precision on an event basis, effective use of photographs is possible such as slide show presentation noting a break point of an event. At the time of presenting photographs in a slide show, for example, by using a continuous transition effect (effect such as dissolve that two images are blended and gradually switched) within a group and using a visual effect whose visual impact is large (effect of transition such as wipe or box-in/out) on a group boundary, more effective slide show noting a break point of an event can be realized than in ordinary slide show in which photographs are simply switched by fixed visual effects.

Next, the proximate data selecting unit 1 will be described in more detail.

Figure 3:
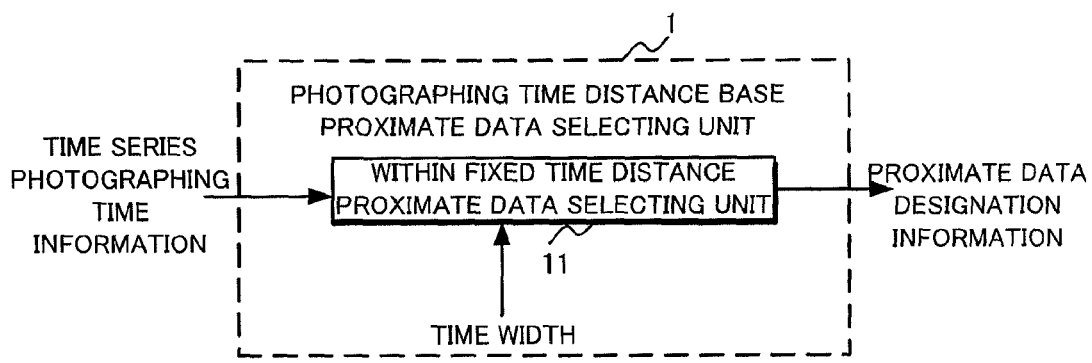
FIG. 3 is a block diagram showing an example of a structure of a proximate data selecting unit 1.

FIG. 3 is a block diagram showing an example of a structure of the proximate data selecting unit 1. As shown in FIG. 3, the proximate data selecting unit 1 may comprise a within fixed time distance proximate data selecting unit 11. Here, the within fixed time distance proximate data selecting unit 11 outputs proximate data designation information with the time series photographing time information and time width information indicative of a time distance (time width) from a certain time as inputs.

The within fixed time distance proximate data selecting unit 11 selects proximate data with respect to each adjacent photographs block based on a photographing time of each photograph indicated by the time series photographing time information and a time width indicated by predetermined time width information, with the constraint that a time interval from a determination time set in the adjacent photographs block to the photographing time is not more than a fixed time.

Next, operation of the photographing time distance base proximate data selecting unit 1 in the present example will be described. When the time series photographing time information and the time width information are applied, the within fixed time distance proximate data selecting unit 11 sets a determination time for each adjacent photographs block to select, as proximate data, photographing time data of a photograph whose time interval from a determination time in the adjacent photographs block to a photographing time is not more than a time width (time interval) indicated by time width information. With a photographing time of an i-th photograph represented as T(i) and a time width indicative of a fixed time distance represented as W, with respect to an adjacent photographs block between j-th and (j+1)th photographs, for example, the proximate data selecting unit 1 may select photographing time data indicative of the photographing time T(i) which satisfies the following expression (5) with respect to the determination time T satisfying the already shown Expression (4) as proximate data.

$$|T(i)-T| < W \qquad \text{Expression (5)}$$

Here, as the time width W, a value determined in advance may be used or a value may be designated by a user.

Thus, in a case of constraint that the time distance at the time of selecting proximate data is not more than a fixed time, a range of time of a photograph to be selected as proximate data can be designated by the time width W. Accordingly, the adjustment of the time width W leads to adjustment of a range of data for use in determining existence/non-existence of a group boundary. Even when automatic adjustment of the time width W fails to work, user's designation of the time width W enables adjustment with ease through interaction with the user.

Setting a time width to be larger, for example, extends a time range of a photograph selected as proximate data to enable balancing of a time change of an index (a photographing density which will be described later, a photographing time interval, etc.) to be calculated for the determination of a group boundary, resulting in detecting a change of a photographing disposition by macro fluctuation to enable a division grading to be loose. Conversely, when a time width is set to be small, a time range of a photograph to be selected as proximate data will be narrowed to detect a change of a photographing disposition by a minute time change in a short time period, thereby enabling a group to be finely divided. Taking a case of grouping photographs of a wedding as an example, it will be also possible, when a large time width is set, to group photographs on a basis of an event of a relatively large unit such as [wedding ceremony], [wedding party] and [second party] and when a small time width is set, to group photographs on a basis of an event of a relatively small unit such as [entering], [speech], [cake cutting] . . . [flower present] in [wedding ceremony].

Figure 4:
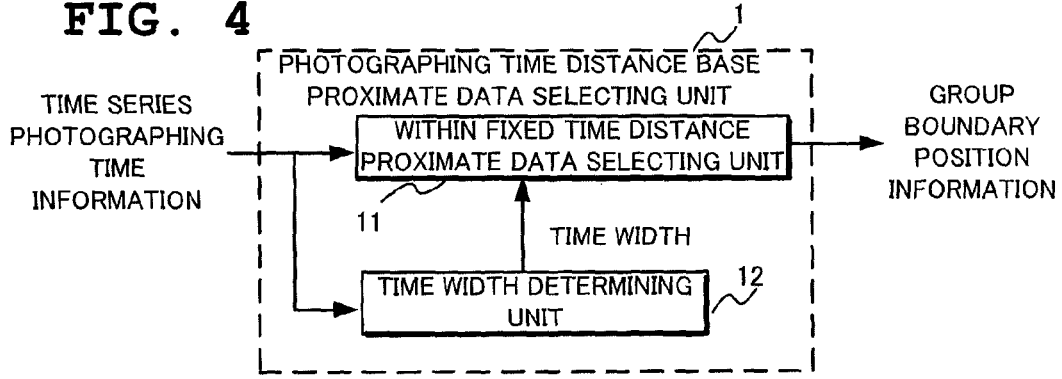
FIG. 4 is a block diagram showing another example of a structure of the proximate data selecting unit 1.

In addition, the structure of the proximate data selecting unit 1 may be such a structure as shown in FIG. 4. FIG. 4 is a block diagram showing another example of a structure of the proximate data selecting unit 1. As shown in FIG. 4, the proximate data selecting unit 1 may include the within fixed time distance proximate data selecting unit 11 and a time width determining unit 12. Here, with the time series photographing time information as an input, the time width determining unit 12 outputs time width information to the within fixed time distance proximate data selecting unit 11. The within fixed time distance proximate data selecting unit 11 outputs the proximate data designation information with the time series photographing time information and the time width information output from the time width determining unit 12 as inputs.

In other words, in the present example, the time width determining unit 12 determines a time width and the within time distance proximate data selecting unit 11 selects proximate data by using the time width W determined by the time width determining unit 12.

The time width determining unit 12 estimates an event having a strong possibility of being photographed from photographing time information of each photograph and determines a time width appropriate for the event. Method of determining a time width appropriate for an event will be described later. The time width W determined by the time width determining unit 12 may be a value varying with an individual determination time or be the same value between certain fixed determination times. The time width information indicative of the time width W determined may be the time width W itself or be time width identification information for identifying any of a plurality of time widths W determined in advance.

The within fixed time distance proximate data selecting unit 11 selects proximate data with respect to each adjacent photographs block based on a photographing time of each photograph indicated in time series by the time series photographing time information and a time width indicated by time width information output from the time width determining unit 12, with constraint that a time distance from a determination time set in the adjacent photographs block to a photographing time falls within a fixed value. Operation of the within fixed time distance proximate data selecting unit 11 is the same as that of the example shown in FIG. 3.

Thus, determining a time width appropriate for a character of an event enables automatic adjustment of a range for proximate data according to the character of the event. It is accordingly possible to reflect a difference in photographing disposition in an event on grouping.

Figure 5:
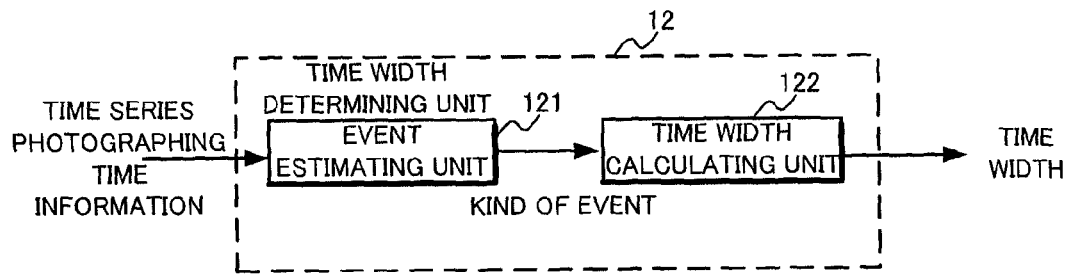
FIG. 5 is a block diagram showing an example of a structure of a time width determining unit 12.

Next, a time width determination method will be described together with a specific structure of the time width determining unit 12. FIG. 5 is a block diagram showing an example of a structure of the time width determining unit 12. As shown in FIG. 5, the time width determining unit 12 may have an event estimating unit 121 and a time width calculating unit 122. The event estimating unit 121 here outputs event kind information indicative of a kind of event to the time width calculating unit 122 with the time series photographing time information as an input. With the event kind information output from the event estimating unit 121 as an input, the time width calculating unit 122 outputs time width information.

The event estimating unit 121 estimates a kind of event as a target of photographing based on at least a photographing time of each photograph. In addition, the time width calculating unit 122 calculates a time width based on a photographing pattern made to correspond to a kind of event estimated by the event estimating unit 121.

Next, operation of the time width determining unit 12 of the present example will be described. When the time series photographing time information is input, the event estimating unit 121 estimates contents (kind) of an event from a photographing time of each photograph. In a case, for example, where a photographing time is time of dining such as lunch or supper, a kind of event can be estimated to be [related to meal] considering that it is highly probable that meal or a scene of dining is photographed. In a case, for example, where a birthday of a person to be an object is registered in advance or where even if a user fails to make explicit registration, when other information such as a key word applied to a photograph of a past birthday party is registered, combining these information and a photographing time and date leads to automatic estimation of when is a birthday, and when the photographing time and date is close to the birthday, a kind of event may be estimated to be [related to birthday] considering that it is highly probable that the event is a birthday party. In this case, taking into consideration that it is highly probable that such an event takes place on holidays and further including a holiday close to a birthday into a range by using calendar information, a kind of event can be estimated to be [related to birthday]. The event estimating unit 121 may determine a kind of event on a determination time basis or may estimate a kind of event by rough classification based on a photographing time of the entire group of photographs to be grouped.

More specifically, the event estimating unit 121 only needs to select at least one kind of event among kinds of event defined in advance based on a determination method determined in advance (determination procedure, condition etc.). When failing to meet any condition of a kind of event, the event estimating unit 12 may output event kind information indicating that a kind of event is unknown.

Output the event kind information for identifying thus estimated event to the time width calculating unit 122. Here, the event kind information may be information indicative of a kind of one event estimated or information indicative of kinds of a plurality of events to be a candidate. The event estimating unit 121 also may output data of an index indicative of reliability of event estimation together with a kind of event.

Next, the time width calculating unit 122 controls (determines) a time width W according to a kind of the event estimated by the event estimating unit 121. When a kind of event indicates an event "related to meal", for example, take a large time width and control to prevent excessive division of a photograph of dining taking into consideration that no photo is taken while dining. In a case where a kind of event is, for example, such "birthday party" as further includes a plurality of divisional events (cake cutting, blowing-out of candle fire, present exchange, etc.), for example, control may be executed to reduce a time width such that individual events in the birthday party can be separated. The time width calculating unit 122 only needs to obtain, with the time width W determined in advance according to a kind of event, a time width W according to a kind of event.

On the other hand, when the event kind information includes kinds of event of a plurality of candidates, calculate a time width appropriate for all the candidates. For example, when a time width appropriate for each kind of event is individually set in advance, the time width calculating unit 122 may weight events in the order of candidates to take a weighted mean, thereby calculating one time width. At this time, in a case where a reliability index of event estimation can be used together, the reliability index may be reflected on a weight. Possible, for example, is taking a weighted means of weights proportional to a reliability index to calculate a time width. When the reliability is low, for example, it is possible to take a weighted mean with a time width of a default added so as to approximate to the time width of the default.

Furthermore, the time width calculating unit 122 may accept input of a parameter indicative of an event grading from a user in order to allow the user to set a grading of an event to be grouped. Event grading here is an index indicative of a scale of an event as a unit of grouping and the coarser the grading becomes, the larger becomes the scale of an event to be a unit of grouping. When the event grading is set, the time width calculating unit 122 only needs to calculate a time width which reflects the event grading on the grouping grading (division grading). More specifically, as the event grading becomes coarser, set the time width to be larger to detect a change of a photographing disposition by a macro fluctuation by increasing the time width and conversely as the event grading becomes finer, set the time width to be smaller to detect a change of a photographing disposition by a minute time change. Ultimately, calculation is made by merging a time width calculated according to a kind of event and a time width reflecting a user's intention toward event grading. Usable as the calculation method is an arbitrary method of merging both widths such as weighting addition of a time width determined according to a kind of event and a time width determined by a user's request.

Thus, by estimating the contents of an event based on the photographing time information, a time width appropriate for the event contents can be selected. In addition, user's designation of an event grading by a parameter enables designation of a time width reflecting both a result of event estimation and a user's intention. Also in the present example, estimation of event contents using only the photographing time information has an advantage of enabling a device to be mounted with ease even on a terminal whose amount of arithmetic operation has heavy constraint such as a camera or a cellular phone.

Figure 6:
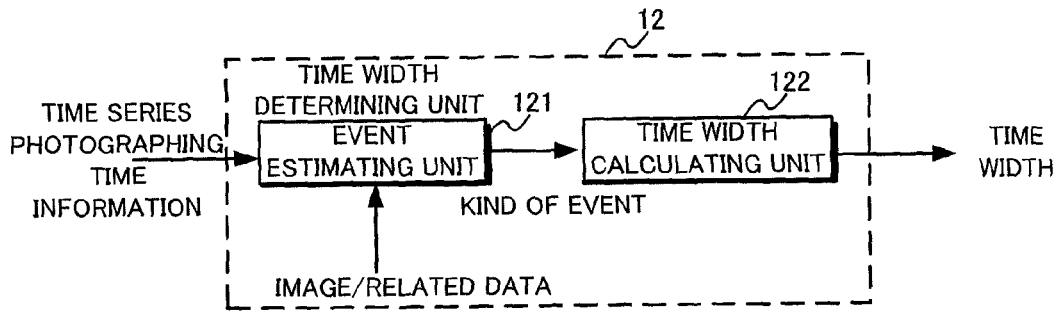
FIG. 6 is a block diagram showing another example of a structure of the time width determining unit 12.

FIG. 6 is a block diagram showing another example of a structure of the time width determining unit 12. As shown in FIG. 6, the time width determining unit 12 may have the event estimating unit 121 and the time width calculating unit 122. Although the time width determining unit 12 shown in FIG. 6 differs from the example shown in FIG. 5 in that the event estimating unit 121 receives input of not only the time series photographing time information but also photograph data (image data of a photograph) or meta data of a photograph, the remainder is the same.

In the present example, the event estimating unit 121 estimates the contents of an event by using image data or meta data of a photograph in addition to a photographing time. More specifically, by using image data of a photograph, information obtained by analyzing color, pattern, and composition is used for event estimation on a basis of the entire photograph or a region obtained by dividing a photograph. In a case, for example, where the entire photograph is dark and the photograph is taken at night, considering that it is highly probable that the object is a night scene, for a group of photographs exhibiting such features, the kind of event is estimated as [related to night scene]. Furthermore, when the photographing time and date is in summer, considering that it is highly probable that it is a firework, to a group of photographs exhibiting such features, the kind of event may be estimated as [firework]. With image data analysis information (entire photograph or color, pattern, composition etc. on a region basis), a time zone of photographing time and a kind of event stored in correlation in advance, the event estimating unit 121 only needs to obtain estimation based on an analysis result and a photographing time by referring to a corresponding kind of event.

Furthermore, when information of a photographing site can be automatically obtained by GPS (Global Positioning System), photographing position information can be also used as meta data. Even with a group of photographs from which the same kind of event "firework" is estimated, when largely different photographing positions are indicated, considering them as different firework events, a range of a photograph corresponding to the kind of event "firework" may be separately indicated with a position at which a photographing position is changed as a boundary. Alternatively, together with a kind of event, information indicative of an event scale may be output. Even if photographing position information of a photograph to be processed cannot be obtained, when photographing position information is obtained from other photograph having proximate photographing time, a photographing position of the photograph to be processed can be estimated by using the photographing position information.

The time width calculating unit 122 only needs to calculate a time width by reflecting not only a kind of event output from the event estimating unit 121 but also a range of a photograph relevant to the estimated kind of event or an event scale. For example, with a time width determined according to a kind of event, a time width indicated by a range of a photograph and a time width determined according to an event scale are merged to obtain calculation.

Thus, by using image data of a photograph or meta data of a photographing position or the like in addition to photographing time information, more precise estimation of an event is enabled to more appropriately calculate a time width.

Next, the group boundary determining unit 2 will be described in more details.

Figure 7:
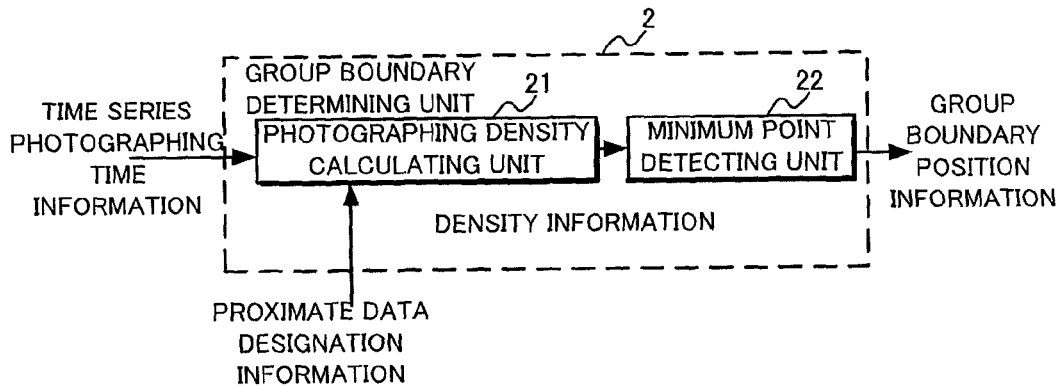
FIG. 7 is a block diagram showing an example of a structure of a group boundary determining unit 2.

FIG. 7 is a block diagram showing an example of a structure of the group boundary determining unit 2. As shown in FIG. 7, the group boundary determining unit 2 may include a photographing density calculating unit 21 and a minimum point detecting unit 22. The photographing density calculating unit 21 here outputs density information indicative of a photographing density as of each determination time to the minimum point detecting unit 22 with the time series photographing time information and the proximate data designation information as inputs. The minimum point detecting unit 22 outputs group boundary position information with density information output from the photographing density calculating unit 21 as an input.

The photographing density calculating unit 21 calculates a photographing density as of each determination time (one or a plurality of determination times in each adjacent photographs block) based on proximate data. Photographing density here represents an index indicative of a degree of congestion of photographing behaviors on a predetermined time region with a determination time as a reference. The minimum point detecting unit 22 compares a photographing density at each determination time calculated by the photographing density calculating unit 21 to detect a minimum point and determines a group boundary based on a position of the detected minimum point in a time region.

Next, operation of the group boundary determining unit 2 of the present example will be described. The photographing density calculating unit 21 receives input of the time series photographing time information and the proximate data designation information. The photographing density calculating unit 21 calculates a photographing density at each determination time by using photographing time data of a proximate photograph as proximate data at each determination time designated by the proximate data designation information. Then, output the density information indicative of the calculated photographing density as of each determination time to the minimum point detecting unit 22. Photographing density may be obtained as a frequency of taking a photo (photographing frequency) in a time region whose range is a time width used as time distance constraint starting at the determination time. It can be obtained by using a window function which will be described later.

The minimum point detecting unit 22 detects a minimum point of a photographing density based on a photographing density at each determination time indicated by density information output from the photographing density calculating unit 21. For example, by comparing values of photographing densities at the respective determination times arranged in time series to check a change of a photographing density at each determination time and detect a point (determination time) at which the change turns from decreasing to increasing as a minimum point. More specifically, with a photographing density at time t as f(t), detect Tm satisfying the following Expression (6) for the three successive determination times Tm−1, Tm and Tm+1 as a minimum point. The minimum point may be detected by a change having a deviation width to some extent.

$$f(Tm-1) > f(Tm) \text{ and } f(Tm) < f(Tm+1)$$ Expression (6)

Other than the foregoing, an arbitrary method of detecting a minimum point can be used. When a minimum point is detected, the minimum point detecting unit 22 only needs to determine that a group is divided before and after the minimum point. Assume, for example, that a determination time at which a minimum point is detected is Tm, determination is made that a group boundary exists in an adjacent photographs block between the k-th and (k+1)th photographs satisfying the following Expression (7).

(Formula 3)

$$T(k) \leq T_m \leq T(k+1)$$ Expression (7)

Since a photograph is taken on an event basis in general, by thus detecting a change of a photographing disposition based on ups and downs of a photographing density at a determination time in each adjacent photographs block enables grouping of photographs with higher precision as compared with a case of simple threshold processing known as related art. In addition, since as photographing time data for use in calculation of a photographing density, none of photographing time data extremely apart in time is used, grouping is enabled with high precision.

Figure 8:
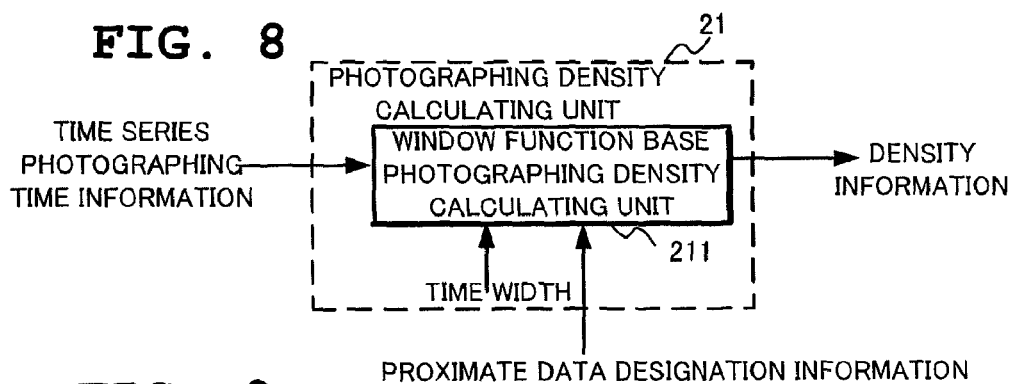
FIG. 8 is a block diagram showing an example of a structure of a photographing density calculating unit 2.

FIG. 8 is a block diagram showing an example of a structure of the photographing density calculating unit 21. As shown in FIG. 8, the photographing density calculating unit 21 may include a window function base photographing density calculating unit 211. The window function base photographing density calculating unit 211 here outputs density information with the time series photographing time information, the proximate data designation information and time width information as inputs.

The window function base photographing density calculating unit 211 calculates a photographing density at each determination time (determination time in each adjacent photographs block) by using a window function defined in advance. Window function here represents a non-negative function having a positive value within a fixed range centered on an origin. Value of a window function indicates how much effect photographing of a certain photograph exerts on a photographing density in a proximate time region.

Figure 9:
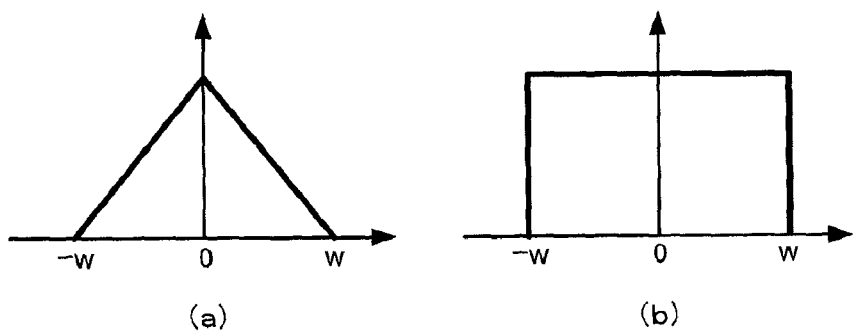
FIG. 9 is a diagram for use in explaining an example of a window function.

FIG. 9 is a diagram for use in explaining an example of a window function. FIG. 9(a) shows an example of a window function having a triangular form. FIG. 9(b) shows an example of a window function having a rectangular form. As shown in FIG. 9(a), when a window function draws a continuously changing triangular form, a change propagated by photographing of one photograph to a photographing density in a proximate time region will be continuous as well. On the other hand, for example, as shown in FIG. 9(b), when the function draws a discontinuously changing function foam having a fixed value at an arbitrary time or the like, a change propagated by photographing of one photograph to a photographing density in a proximate time region will be discontinuous as well. While in a case of a triangular window function, for example, the density is decreased proportionally with time, in a case of a function having a negative exponential functional form, this effect will be limited only to a more proximate region. For a window function, using an attenuation function which attenuates as it goes away from an origin results in mitigating, with respect to photographing at a time apart in time from a determination time, weighting on a photographing density at the determination time.

Configuration of a window function is not limited to those shown in FIG. 9, for which a function having an upward convex within a fixed range, for example, may be used or a part of a density distribution function having a normal distribution may be cut out in place of a triangular form. Configuration may be laterally asymmetric. It is also possible, with a parameter W for adjusting a window width defined in these functions, to change the window width to widen or narrow the effect range.

Next, operation of the photographing density calculating unit 21 of the present example will be described. When the time series photographing time information and the proximate data designation information are input, with respect to each photographing time indicated by photographing time data of a proximate photograph which is proximate data as of each determination time designated by the proximate data designation information, the window function base photographing density calculating unit 211 arranges a window function on a time base with the photographing time as an origin (center) to calculate a photographing density at each determination time as superposition of window functions (window function corresponding to a photographing time of each proximate photograph at the determination time) at the determination time.

Here, specific description will be made of a method of calculating a photographing density using a window function. With a window function represented as hw(t) whose window width is represented as W, a photographing density at the determination time T is obtained by the following Expression (8). Here, i0 and i1 are a minimum value and a maximum value, respectively, of an index value indicative of a range of a proximate photograph designated as proximate data by the proximate data designation information.

(FORMULA 4)

$$f(T) = \sum_{i=i_0}^{i_1} h_w(T - T(i))$$   Expression(8)

Figure 10:
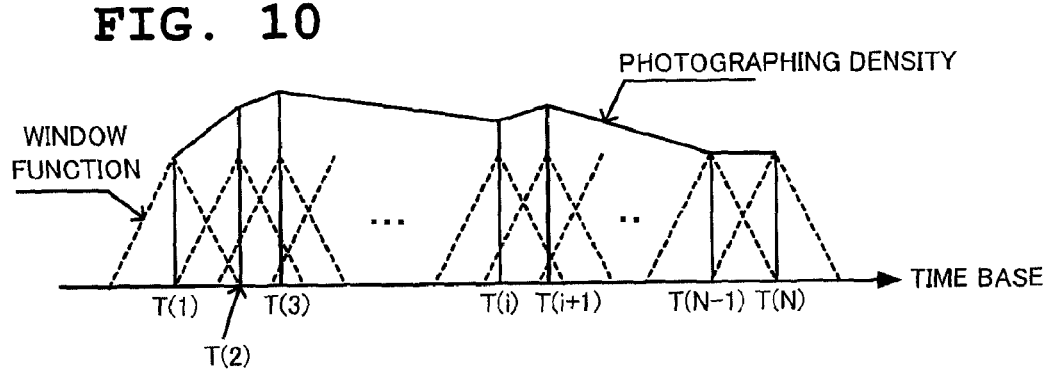
FIG. 10 is a diagram for use in explaining an example of calculation of a photographing density.

Using a triangular window function, for example, leads to calculation of such a photographing density as shown in FIG. 10. Shown in FIG. 10 is that a photographing density at a photographing time T(1), for example, is superposition of only the window functions corresponding to the photographing time T(1) (window functions having the photographing time T(1) as the origin in FIG. 10). Also shown is that the photographing density at a photographing time T(2), for example, is superposition between a window function corresponding to the photographing time T(2) and a window function corresponding to a photographing time T(3). While in the example shown in FIG. 10, ups and downs of a photographing density are expressed by linking photographing densities at the respective photographing times, the calculation method by superposition of window functions enables calculation of a photographing density at an arbitrary point and in practice, a photographing density is calculated as superposition of window functions at a determination time. There is a case where a determination time is a photographing time.

In addition, by setting a time width at the time of selecting proximate data and a time width given by a window width (parameter W) in a window function to have the same value, proximate photographs (whose window function has a non-negative value at the determination time) which will affect a determination time can be designated as proximate data with neither shortage nor excess. The two time widths need not be coincident and when they differ from each other, it is only necessary to apply a window function within a range designated by the proximate data designation information. In other words, to a proximate photograph indicated as proximate data by the proximate data designation information, a window function is made to correspond to obtain their superposition.

Thus, using a window function enables a photographing density at an arbitrary time to be calculated with ease. In addition, since by a form of a window function or a window width, a degree or a time range to/within which one photographing time will make an effect can be freely set, photographs can be grouped with high precision. Furthermore, setting a window width to be freely changed by a user enables grading of grouping of photographs to be changed according to user's intention with ease.

Figure 11:
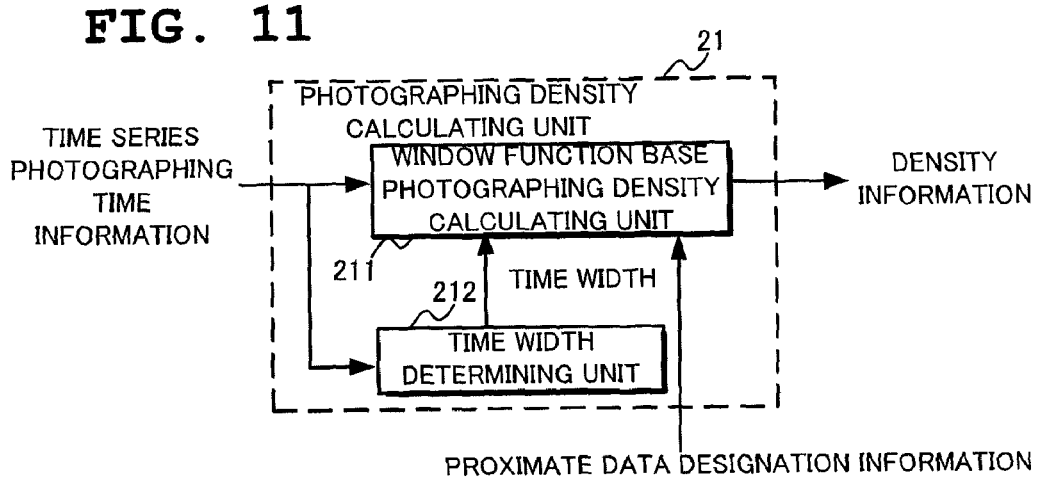
FIG. 11 is a block diagram showing another example of a structure of the photographing density calculating unit 21.

FIG. 11 is a block diagram showing another example of a structure of the photographing density calculating unit 21. As shown in FIG. 11, the photographing density calculating unit 21 may include the window function base photographing density calculating unit 211 and a time width determining unit 212. The time width determining unit 212 here outputs time width information to the window function base photographing density calculating unit 211 with the time series photographing time information as an input. With the time series photographing time information, the proximate data designation information and the time width information output from the time width determining unit 212 as inputs, the window function base photographing density calculating unit 211 outputs density information.

More specifically, in the present example, the window function base photographing density calculating unit 211 calculates a photographing density by using a time width W determined by the time width determining unit 212 as a window width. The time width determining unit 212 only needs to execute the same processing as that of the time width determining unit 12 shown in FIG. 5 or FIG. 6.

Thus, by setting a time width appropriate for an estimated event by the time width determining unit 212, a photographing density with the time width appropriate for the event is calculated, so that highly precise grouping which meets event contents can be executed with ease.

Figure 12:
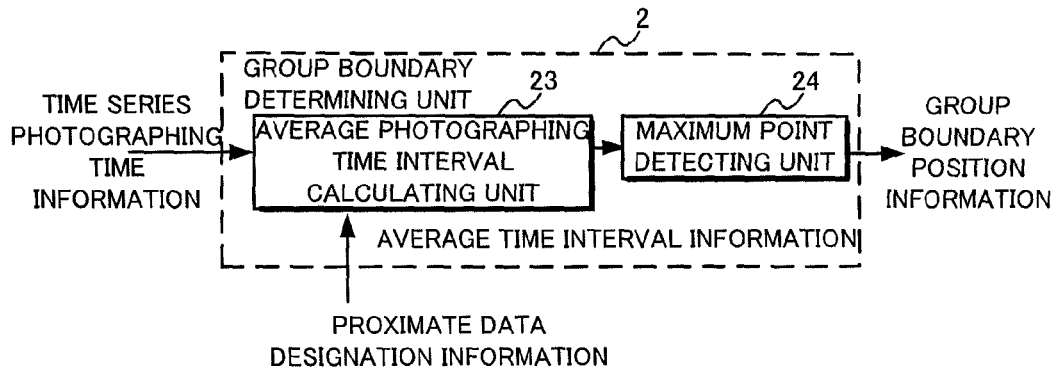
FIG. 12 is a block diagram showing another example of a structure of the group boundary determining unit 2.

Structure of the group boundary determining unit 2 can be such a structure as shown in FIG. 12. FIG. 12 is a block diagram showing another example of a structure of the group boundary determining unit 2. As shown in FIG. 12, the group boundary determining unit 2 may include an average photographing time interval calculating unit 23 and a maximum point detecting unit 24. Here, with the time series photographing time information and the proximate data designation information as inputs, the average photographing time interval calculating unit 23 outputs average time interval information indicative of an average of a photographing time interval at each determination time to the maximum point detecting unit 24. The maximum point detecting unit 24 outputs group boundary position information with the average time interval information output from the average photographing time interval calculating unit 23 as an input.

The average photographing time interval calculating unit 23 calculates an average value of a photographing time interval of a proximate photograph at each determination time (one or a plurality of determination times in each adjacent photographs block). The maximum point detecting unit 24 detects a group boundary by detecting a determination time as a maximum point from an average value of a photographing time interval of a proximate photograph at each determination time which value is calculated by the average photographing time interval calculating unit 23.

Next, operation of the group boundary determining unit 2 in the present example will be described. The average photographing time interval calculating unit 23 receives input of the time series photographing time information and the proximate data designation information. The average photographing time interval calculating unit 23 calculates an average photographing time interval at each determination time by using photographing time data of a proximate photograph as proximate data at each determination time designated by the proximate data designation information. More specifically, first, obtain a difference between adjacent photographing times among proximate photographs to calculate an average value of the same. Possible as a method of calculating an average photographing time interval is simply averaging these differences or averaging by weighting according to a time distance from a determination time. Then, output average time interval information indicative of the calculated average photographing time interval of a proximate photograph at each determination time to the maximum point detecting unit 24.

The maximum point detecting unit 24 detects a maximum point of an average photographing time interval based on the average time interval information output from the average photographing time interval calculating unit 23. For example, calculate an increase/decrease in a value of an average photographing time interval at each determination time aligned in time series to detect a point (determination time) at which an increase turns into a decrease as a maximum point. More specifically, with an average photographing time interval at time t as $g(t)$, with respect to three successive determination times $Tm-1$, $Tm$ and $Tm+1$, detect $Tm$ satisfying the following Expression (9) as a maximum point. Maximum point may be detected by a change having a width of fluctuation to some extent.

$$g(Tm-1)<g(Tm) \text{ and } g(Tm)>g(Tm+1) \qquad \text{Expression (9)}$$

Other than those described above, an arbitrary method of detecting a maximum point can be used. The maximum point detecting unit 24, when a maximum point is detected, only needs to determine that before and after the maximum point, the groups are divided. In other words, with a determination time when the maximum point is detected represented as $Tm$, determination is made that there exists a group boundary between adjacent photographs block between k-th and (k+1) th photographs satisfying the already shown Expression (7). Determination of a group boundary by a maximum point is the same as the determination of a group boundary by a minimum point shown in FIG. 7.

Since an average photographing time interval can be interrupted as a reciprocal number of a photographing density, by detecting a change of a photographing disposition based on ups and downs of an average time interval at a determination time in each adjacent photographs block similarly to the case using a photographing density, photographs can be grouped with higher precision as compared with a case of simple threshold processing known as related art. In addition, since as photographing time data for use in calculating an average photographing time interval, none of photographing time data extremely apart in time is used, grouping can be realized to high precision.

Figure 13:
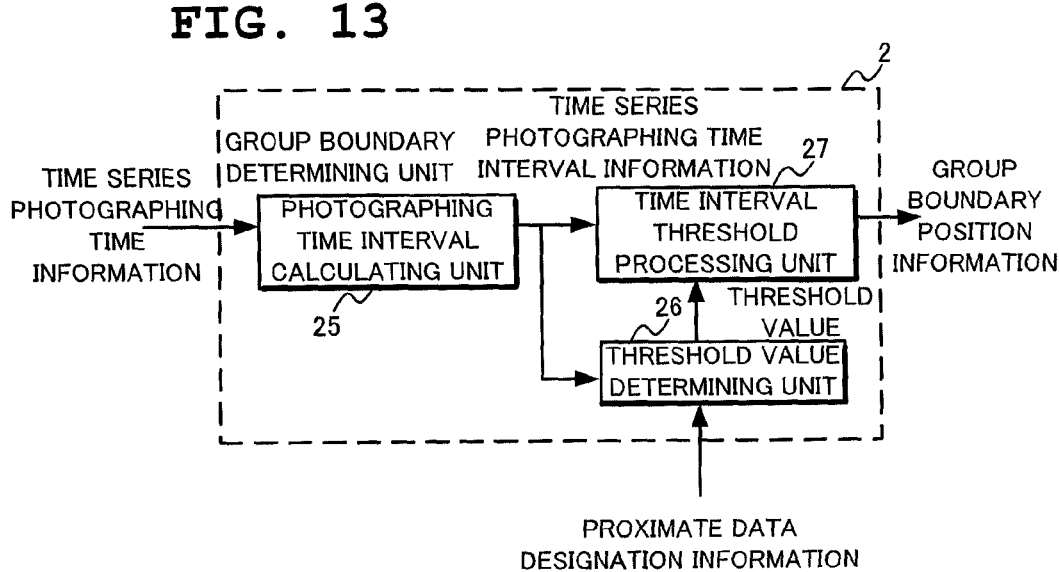
FIG. 13 is a block diagram showing a further example of a structure of the group boundary determining unit 2.

The structure of the group boundary determining unit 2 may be such a structure as shown in FIG. 13. FIG. 13 is a block diagram showing a further example of a structure of the group boundary determining unit 2. As shown in FIG. 13, the group boundary determining unit 2 may include a photographing time interval calculating unit 25, a threshold value determining unit 26 and a time interval threshold processing unit 27. Here, the photographing time interval calculating unit 25 outputs time series photographing time interval information indicative of a photographing time interval between photographs aligned in time series with the time series photographing time information as an input. The threshold value determining unit 26 outputs a threshold value of a photographing time interval to be a reference to determine whether a group boundary exists or not, with the time series photographing time interval information output from the photographing time interval calculating unit 25 and the proximate data designation information as inputs. The time interval threshold processing unit 27 outputs group boundary position information with the time series photographing time interval information output from the photographing time interval calculating unit 25 and a threshold value output from the threshold value determining unit 26 as inputs.

The photographing time interval calculating unit 25 calculates a photographing time interval between photographs aligned in time series based on photographing time information of each photograph to be grouped. The threshold value determining unit 26 determines a threshold value of a photographing time interval to be a reference for determining existence/non-existence of a group boundary by using a photographing time interval between proximate photographs selected as proximate data as of each determination time which data is designated by the proximate data designation information. The time interval threshold processing unit 27 determines whether a group boundary exists or not by subjecting a time interval of each adjacent photographs block to the threshold processing by using the threshold value determined by the threshold value determining unit 26.

Next, operation of the group boundary determining unit 2 of the present example will be described. The photographing time interval calculating unit 25 receives input of the time series photographing time information. The photographing time interval calculating unit 25 calculates a difference between photographing times of two photographs adjacent to each other in time series and outputs the difference as time series photographing time interval information. The difference calculation method here may be calculation of a difference between photographing times of two photographs adjacent to each other in time series known as related art or calculation according to a fixed rule. For example, after calculating a difference between photographing times of two photographs adjacent to each other in time series, several preceding or succeeding data is further averaged to have a photographing time interval. Thus calculated time series photographing time interval information is output to the threshold value determining unit 26 and the time interval threshold processing unit 27.

The threshold value determining unit 26 calculates a threshold value of a photographing time interval to be a reference for determining whether a group boundary exists or not by using a photographing time interval between proximate photographs selected as proximate data at each determination time which is data designated by the proximate data designation information, which interval is obtained from the time series photographing time interval information output from the photographing time interval calculating unit 25. The threshold value determining unit 26 executes control such that when a photographing time interval between proximate photographs at each determination time is short, the threshold value is small and conversely when a photographing time interval is long, the threshold value is large. For example, by using the already shown Expression (3), a threshold value may be calculated based on a value obtained by averaging a logarithm of a photographing time interval. Then, the calculated threshold value is output to the time interval threshold processing unit 27.

The time interval threshold processing unit 27 determines whether a group boundary exists or not by subjecting a time interval of the adjacent photographs block to the threshold processing by using a threshold value determined by the threshold vale determining unit 26.

Thus, by appropriately controlling a threshold value of a photographing time interval to be a reference for determining existence/non-existence of a group boundary according to whether a photographing interval of a proximate photograph is long or short, photographs can be grouped with higher precision as compared with a case of simple threshold processing known as related art. In addition, since at the time of determining a threshold value, no photographing time data of photographs extremely apart in time is used, grouping precision can be improved.

As described in the foregoing, even when a character of an event or a user's photographing disposition varies, the present exemplary embodiment enables grouping of photographs with high precision. The reason is that by selecting proximate data with a time distance from a determination time to a photographing time in each adjacent photographs block as constraint to determine whether a group boundary exists or not in the adjacent photographs block by using the proximate data, a series of photographs seemed to be related to the same event or object can be used for determination in an arbitrary adjacent photographs block without omission caused by the limitation on the number of photographs. As a result, a change of a photographing disposition can be detected while more precisely reflecting an effect of a user's photographing disposition or a character of an event in an arbitrary adjacent photographs block. Even when photographs are sparsely taken, the present exemplary embodiment also enables grouping of photographs with high precision. The reason is that using only photographing time data of photographs proximate in time prevents effects of photographs apart in time from being exerted on determination.

While in the foregoing, the description has been made only with respect to grouping of photographs, use of an index used in the determination at the time of grouping photographs enables selection of a representative image in the group as well. It is possible, for example, to detect a maximum point of a photographing density or a minimum point of an average time interval as a climax point and selecting a photograph taken at a time most proximate to the climax point as a representative image.

Second Exemplary Embodiment

Figure 14:
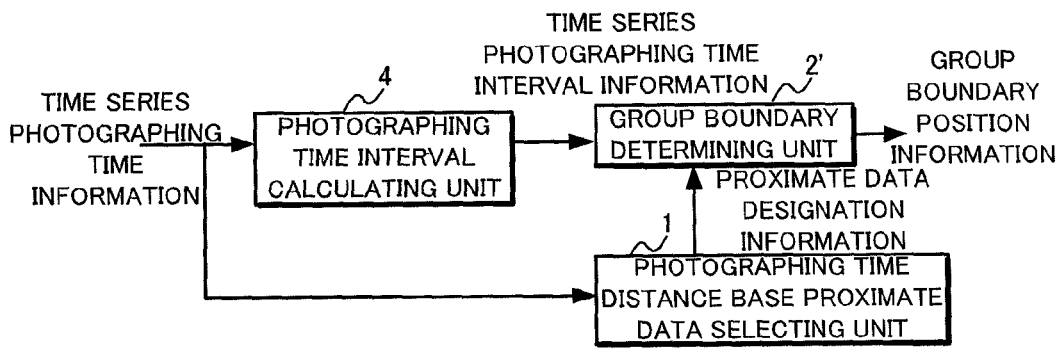
FIG. 14 is a block diagram showing an example of a structure of a photograph grouping device according to a second exemplary embodiment.

Next, a second exemplary embodiment of the present invention will be described with reference to the drawings. FIG. 14 is a block diagram showing an example of a structure of a photograph grouping device according to the second exemplary embodiment of the present invention. The photograph grouping device shown in FIG. 14 comprises the photographing time distance base proximate data selecting unit 1 (simply referred to as the proximate data selecting unit 1), a group boundary determining unit 2' and a photographing time interval calculating unit 4. The photographing time interval calculating unit 4 here outputs the time series photographing time interval information to the group boundary determining unit 2' with time series photographing time information as an input. The proximate data selecting unit 1 outputs the proximate data designation information to the group boundary determining unit 2' with the time series photographing time information as an input. The group boundary determining unit 2' outputs the group boundary position information with the time series photographing time interval information output from the photographing time interval calculating unit 4 and the proximate data designation information output from the proximate data selecting unit 1 as inputs.

In the present exemplary embodiment, the group boundary determining unit 2' differs from the group boundary determining unit 2 according to the first exemplary embodiment in that applied information is the time series photographing time interval information. The proximate data selecting unit 1 is the same as the proximate data selecting unit 1 according to the first exemplary embodiment. The photographing time interval calculating unit 4 is the same as the photographing time interval calculating unit 25 shown in FIG. 13.

Next, operation of the present exemplary embodiment will be described. The photographing time interval calculating unit 4 receives input of time series photographing time information. The photographing time interval calculating unit 4 calculates a photographing time interval between photographs aligned in time series based on the time series photographing time information. Operation of the photographing time interval calculating unit 4 is the same as that of the photographing time interval calculating unit 25 shown in FIG. 13, which unit outputs the time series photographing time interval information.

On the other hand, the time series photographing time information is also applied to the proximate data selecting unit 1. When receiving input of the time series photographing time information, the proximate data selecting unit 1 outputs, to the group boundary determining unit 2', proximate data designation information which is information for designating photographing time data satisfying constraint on a time distance from a determination time set in each adjacent photographs block. Operation of the proximate data selecting unit 1 is the same as that of the proximate data selecting unit 1 according to the first exemplary embodiment shown in FIG. 1, which unit outputs the proximate data designation information.

The group boundary determining unit 2' receives input of the time series photographing time interval information output from the photographing time interval calculating unit 4 and the proximate data designation information output from the proximate data selecting unit 1. By using a photographing time interval between adjacent photographs selected as proximate data at each determination time which is designated by the proximate data designation information, which interval is obtained from the time series photographing time interval information, the group boundary determining unit 2' determines whether there exists a group boundary in each adjacent photographs block. Then, based on the determination result, output the group boundary position information.

Next, the group boundary determining unit 2' will be more detailed.

Figure 15:
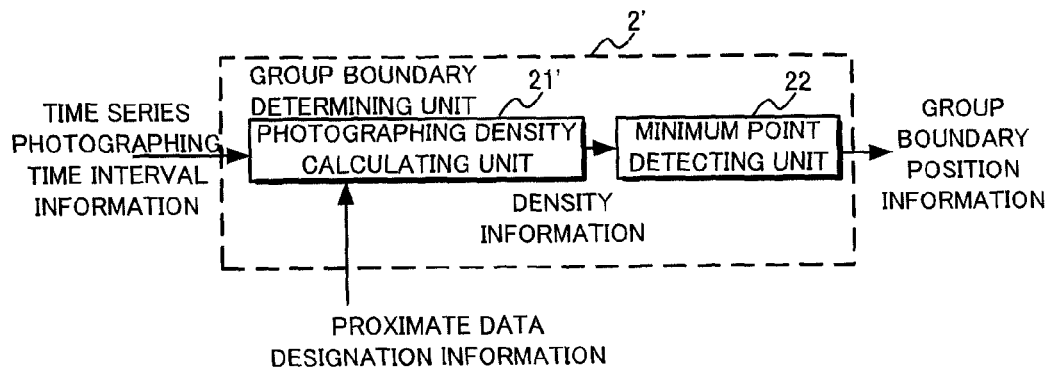
FIG. 15 is a block diagram showing an example of a structure of a group boundary determining unit 2'.

FIG. 15 is a block diagram showing an example of a structure of the group boundary determining unit 2. The group boundary determining unit 2', as shown in FIG. 15, may comprise a photographing density calculating unit 21' and the minimum point detecting unit 22. The photographing density calculating unit 21' here outputs the density information with the time series photographing time interval information and the proximate data designation information as inputs. The minimum point detecting unit 22 outputs the group boundary position information with the density information output from the photographing density calculating unit 21' as an input.

In the present example, the photographing density calculating unit 21' differs from the photographing density calculating unit 21 in the first exemplary embodiment shown in FIG. 7 in that applied information is the time series photographing time interval information. The minimum point detecting unit 22 is the same as the minimum point detecting unit 22 shown in FIG. 7.

Next, operation of the group boundary determining unit 2' of the present example will be described. When the time series photographing time interval information is applied, the photographing density calculating unit 21' obtains a photographing time interval between proximate photographs selected as proximate data at each determination time designated by the proximate data designation information from the time series photographing time interval information and calculates a photographing density at each determination time by using the obtained photographing time interval between the proximate photographs. The photographing time interval between proximate photographs can be obtained in some cases only by selecting photographing time interval data relevant to the photographing time interval between proximate photographs from the time series photographing time interval information. Calculation of the photographing density may be realized by averaging a photographing time interval between the respective proximate photographs and taking the reciprocal number of the same as a photographing density. If there fails to exist a photographing time interval between proximate photographs at a certain determination time (e.g. if only one proximate photograph is selected by time distance constraint), the photographing density can be considered as 0. As an average of a photographing time interval, a simple average may be obtained or a weighted average may be obtained according to a time distance from a determination time. Then, the photographing density calculating unit 21' outputs density information indicative of the calculated photographing density at each determination time to the minimum point detecting unit 22.

Operation of the minimum point detecting unit 22 is the same as that of the minimum point detecting unit 22 shown in FIG. 7 and based on density information output from the photographing density calculating unit 21, the unit detects a minimum point of the photographing density to determine whether a group boundary exists or not based on the detection result.

Thus, using photographing time interval data in place of directly using photographing time data similarly enables detection of a change of a photographing disposition based on ups and downs of a photographing density, resulting in enabling grouping of photographs with high precision.

Figure 16:
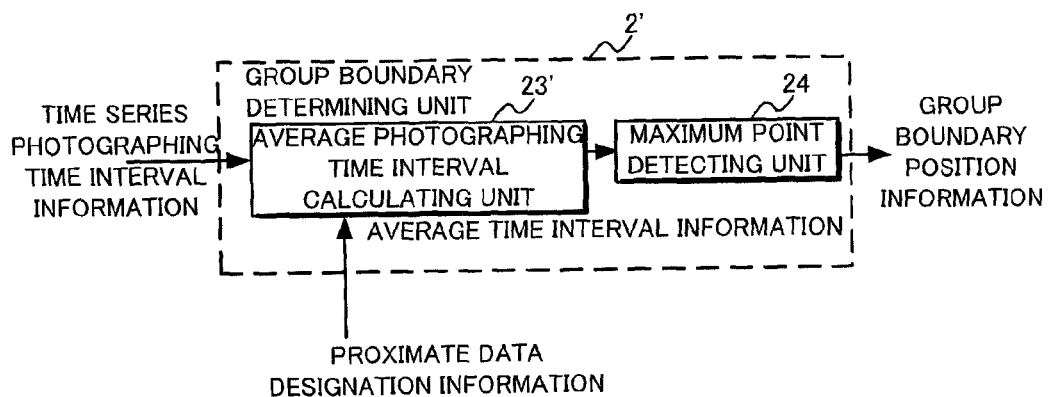
FIG. 16 is a block diagram showing another example of a structure of the group boundary determining unit 2'.

Structure of the group boundary determining unit 2' may be such a structure as shown in FIG. 16. FIG. 16 is a block diagram showing another example of a structure of the group boundary determining unit 2'. As shown in FIG. 16, the group boundary determining unit 2' may include an average photographing time interval calculating unit 23' and the maximum point detecting unit 24. The average photographing time interval calculating unit 23' outputs average time interval information with the time series photographing time interval information and the proximate data designation information as inputs. The maximum point detecting unit 24 outputs the group boundary position information with the average time interval information output from the average photographing time interval calculating unit 23' as an input.

In the present example, the average photographing time interval calculating unit 23' differs from the average photographing time interval calculating unit 23 according to the first exemplary embodiment shown in FIG. 8 in that information to be applied is time series photographing time interval information. The maximum point detecting unit 24 is the same as the maximum point detecting unit 24 shown in FIG. 8.

Next, operation of the group boundary determining unit 2' of the present example will be described. When the time series photographing time interval information is applied, the average photographing time interval calculating unit 23' obtains, from the time series photographing time interval information, a photographing time interval between proximate photographs selected as proximate data at each determination time which is designated by the proximate data designation information and calculates an average photographing time interval at each determination time by using the obtained photographing time interval between the proximate photographs. Method of calculating an average photographing time interval is the same as that of the average photographing time interval calculating unit 23 shown in FIG. 8. Then, the average photographing time interval calculating unit 23' outputs average time interval information indicative of the calculated average photographing time interval at each determination time to the maximum point detecting unit 24.

Operation of the maximum point detecting unit 24 is the same as that of the maximum point detecting unit 24 shown in FIG. 8 and based on average time interval information output from the average photographing time interval calculating unit 23', the unit detects a maximum point of the average photographing time interval to determine whether a group boundary exists or not based on the detection result.

Thus, using photographing time interval data in place of directly using photographing time data similarly enables detection of a change of a photographing disposition based on ups and downs of an average photographing time interval, resulting in enabling grouping of photographs with high precision.

Figure 17:
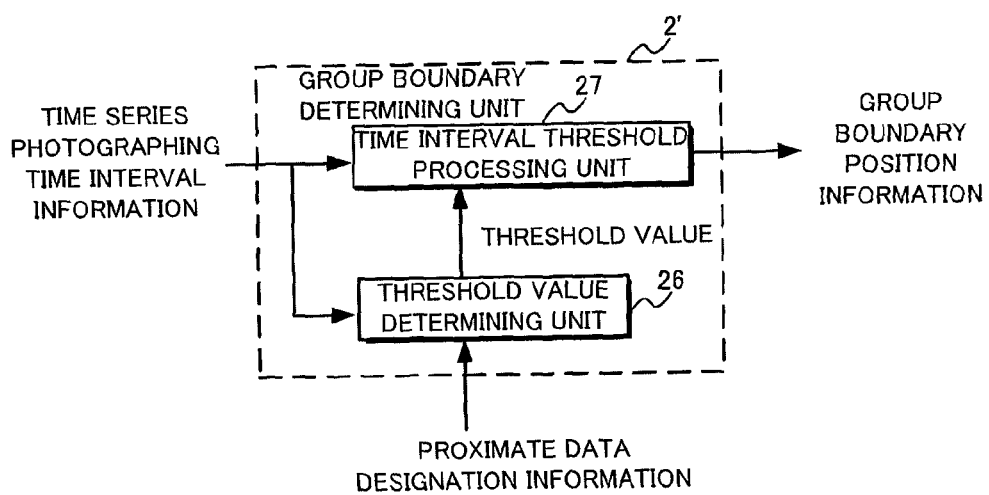
FIG. 17 is a block diagram showing a further example of a structure of the group boundary determining unit 2'.

Structure of the group boundary determining unit 2' may be such a structure as shown in FIG. 17. FIG. 17 is a block diagram showing a further example of a structure of the group boundary determining unit 2'. As shown in FIG. 17, the group boundary determining unit 2' may include the threshold value determining unit 26 and the time interval threshold processing unit 27. The threshold value determining unit 26 outputs a threshold value with the time series photographing time interval information and the proximate data designation information as inputs. The time interval threshold processing unit 27 outputs the group boundary position information with the threshold value output from the threshold value determining unit 26' and the time series photographing time interval information as inputs.

In the present example, the photographing time interval calculating unit 25 in the example of the group boundary determining unit 2 shown in FIG. 13 is omitted because it is structured as the photographing time interval calculating unit 4. The remainder is the same as that of the group boundary determining unit 2 shown in FIG. 13.

Thus, also in the structure in which to the group boundary determining unit 2', photographing time interval data is applied, a threshold value can be controlled appropriately in the same manner according to whether a photographing interval between proximate photographs is long or short, resulting in enabling photographs to be grouped with higher precision as compared with a case of simple threshold processing known as related art.

Third Exemplary Embodiment

Figure 18:
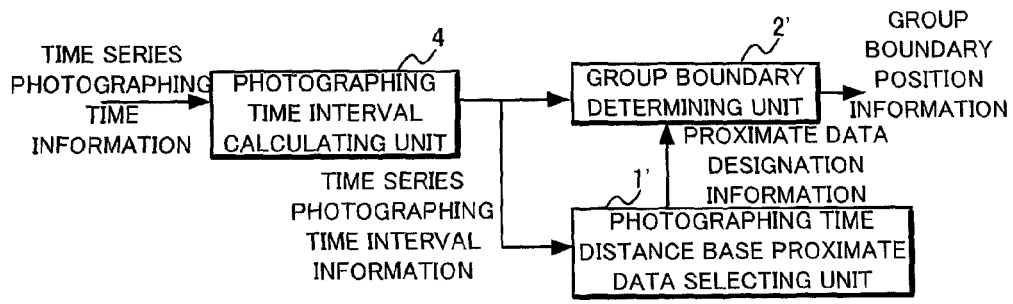
FIG. 18 is a block diagram showing an example of a structure of a photograph grouping device according to a third exemplary embodiment.
Figure 19:
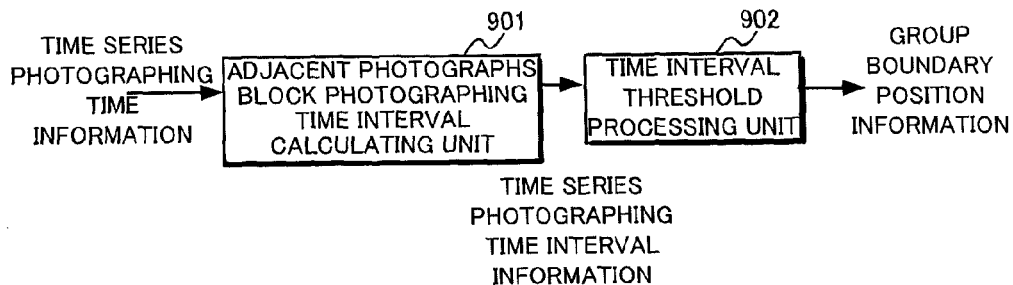
FIG. 19 is a block diagram showing an example of a structure of a photograph grouping device according to related art.
Figure 20:
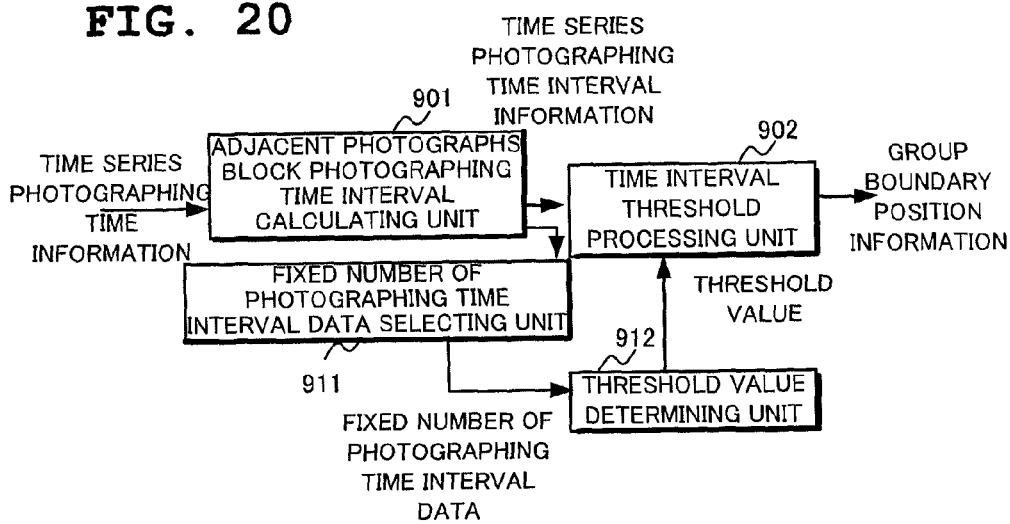
FIG. 20 is a block diagram showing an example of a structure of a photograph grouping device according to related art.

Next, a third exemplary embodiment of the present invention will be described with reference to the drawings. FIG. 18 is a block diagram showing an example of a structure of a photograph grouping device according to the third exemplary embodiment of the present invention. The photograph grouping device shown in FIG. 18 comprises a photographing time distance base proximate data selecting unit 1' (simply referred to as the proximate data selecting unit 1'), the group boundary determining unit 2' and the photographing time interval calculating unit 4. The photographing time interval calculating unit 4 here outputs the time series photographing time interval information to the group boundary determining unit 2' with the time series photographing time information as an input. The proximate data selecting unit 1' outputs the proximate data designation information to the group boundary determining unit 2' with the time series photographing time interval information output from the photographing time interval calculating unit 4 as an input. The group boundary determining unit 2' outputs the group boundary position information with the time series photographing time interval information output from the photographing time interval calculating unit 4 and the proximate data designation information output from the proximate data selecting unit 1 as inputs.

The present exemplary embodiment differs from the second exemplary embodiment shown in FIG. 14 in that information to be applied to the proximate data selecting unit 1' is the time series photographing time interval information.

The proximate data selecting unit 1' selects, with respect to each adjacent photographs block, a photograph having a photographing time which satisfies constraint on time distance from a certain time determined in the adjacent photographs block as a proximate photograph for use in determining existence/non-existence of a group boundary based on the time series photographing time interval information and outputs proximate data designation information for designating data of a photographing time interval between the proximate photographs to the group boundary determining unit 2'. In the present exemplary embodiment, the proximate data selecting unit 1' selects as proximate data, from the time series photographing time interval information, photographing time interval data of a photograph whose photographing time has a time interval from a determination time set in each adjacent photographs block that satisfies predetermined constraint and outputs proximate data designation information which designates the proximate data, thereby designating a proximate photograph to the group boundary determining unit 2'.

More specifically, as proximate data for use in determining whether there exists a group boundary between j-th and (j+1) th photographs, selected as proximate data is the photographing time interval data indicating a photographing time interval $d(i)$ whose time distance from the determination T satisfying the already shown Expression (4) satisfies certain fixed constraint. When constraint that a time distance is within a fixed time W is used, for example, it is possible to obtain i0 and i1 that satisfy the following Expression (10) equivalent to the already shown Expression (5) to select data of a photographing time interval between photographs whose indexes are included in a range from i0 to i1 as proximate data. Here, $\Delta = T - T(j)$, which takes an arbitrary value from 0 to $d(j)$ according to a position of the determination time T in an adjacent photographs block.

(FORMULA 5)

$$\sum_{i=i_0}^{j-1} d(i) + \Delta \leq W, \sum_{i=j}^{i_1} d(i) - \Delta \leq W \qquad \text{Expression(10)}$$

Then, to the group boundary determining unit 2', the proximate data selecting unit 1' outputs proximate data designation information which designates the selected proximate data with respect to each determination time T (one or a plurality of determination times T set in each adjacent photographs block), for example. The proximate data designation information may be selected proximate data itself (data of a photographing time interval between proximate photographs) or information indicative of an index value of a photograph selected as proximate data. In addition, when successive photographs are selected as proximate photographs, the information may be an index value indicative of a range of selected photographs (e.g. a maximum value and a minimum value of an index of a selected photograph, either the maximum value or the minimum value and the selected number, or the like). Operation of the group boundary determining unit 2' is the same as that of the group boundary determining unit 2' shown in FIG. 14. When photographs not in succession are selected as a proximate photograph, the proximate data selecting unit 1' may obtain a photographing time interval between the selected proximate photographs based on the time series photographing time interval information to output proximate data designation information indicative of data of the obtained photographing time interval between the proximate photographs, or the group boundary determining unit 2' may obtain a photographing time interval between proximate photographs based on an index value of a proximate photograph indicated by the proximate data designation information and the time series photographing time interval information.

Similarly to the second exemplary embodiment, the group boundary determining unit 2' determines whether a group boundary exists in an adjacent photographs block by using a photographing time interval between proximate photographs indicated by the proximate data designation information.

Thus, the present exemplary embodiment similarly enables a structure in which time series photographing time interval information is applied to a photograph grouping device to group photographs to high precision as well.

While the present invention has been described with reference to the preferred modes of implementation (and exemplary embodiments) in the foregoing, the present invention is not limited to the above-described preferred modes of implementation (and exemplary embodiments). Structure and details of the present invention allow various modifications that those skilled in the art can understand within the scope of the present invention.

INCORPORATION BY REFERENCE

This application is based upon and claims the benefit of priority from Japanese patent application No. 2007-106004, filed on Apr. 13, 2007, the disclosure of which is incorporated herein in its entirety by reference.

INDUSTRIAL APPLICABILITY

The present invention is applicable to such a device as manages a plurality of pieces of photograph data including their photographing times. It is preferably applicable to, for example, a digital camera device or a mobile terminal with a camera which hold photograph data or a personal computer to which photograph data of a photograph taken by using them is applied or the like. The present invention is applicable also as a photograph grouping program to be installed on these devices.

What is claimed is:

1. A photograph grouping device for grouping photographs by determining whether there exists a group boundary between two photographs adjacent to each other, the photographs aligned in the order of photographing, comprising:
a processor; and
a memory;
wherein said processor executes:
a proximate photograph designating unit for determining, with respect to each adjacent photographs block, which is a time block sandwiched between photographing times of two photographs adjacent to each other, one or a plurality of times in the adjacent photographs block as a determination time, and based on time series photographing time information indicative of a photographing time of each of the photographs to be grouped, designating, as proximate photographs, all photographs satisfying predetermined constraint on time distance between said determination times and their photographing time, and
a group boundary determining unit for, with respect to each adjacent photographs block, by using photographing times of said proximate photographs or photographing time intervals between said proximate photographs, detecting a change of a photographing disposition in the adjacent photographs block to determine whether there exists a group boundary between two photographs having each adjacent photographs block sandwiched therebetween.

2. The photograph grouping device according to claim 1, wherein the time distance constraint is that a time interval is not more than a fixed time.

3. The photograph grouping device according to claim 1, wherein the group boundary determining unit comprises:
a photographing density calculating unit for calculating, by using a photographing time of a photograph designated as a proximate photograph at one or a plurality of determination times in each adjacent photographs block, a photographing density indicative of a degree of congestion of behavior of taking a photograph on a predetermined time region with each determination time as a reference; and
a minimum point detecting unit for detecting a minimum point by comparing photographing densities at the respective determination times calculated by said photographing density calculating unit to determine a group boundary based on a position of the detected minimum point in the time region.

4. The photograph grouping device according to claim 1, wherein the group boundary determining unit comprises:
an average photographing time interval calculating unit for calculating, by using a photographing time of a photograph designated as a proximate photograph at one or a plurality of determination times in each adjacent photographs block, an average photographing time interval indicative of an average value of a photographing time interval between photographs taken in a predetermined time region with each determination time as a reference; and
a maximum point detecting unit for detecting a maximum point by comparing average photographing time intervals at the respective determination times calculated by said average photographing time interval calculating unit to determine a group boundary based on a position of the detected maximum point in the time region.

5. The photograph grouping device according to claim 1, wherein the group boundary determining unit comprises:
a photographing time interval calculating unit for calculating a time interval of each adjacent photographs block as a photographing time interval between photographs adjacent to each other in a group of photographs to be grouped based on the time series photographing time information;
a threshold value determining unit for determining, with respect to each adjacent photographs block, a threshold value of a time interval of the adjacent photographs block by using a photographing time interval between photographs designated as a proximate photograph at one or a plurality of determination times in the adjacent photographs block by the proximate photograph designating unit, which interval is obtained from a time interval of each adjacent photographs block calculated by said photographing time interval calculating unit; and
a threshold processing unit for executing threshold processing of a time interval of each adjacent photographs block by using a threshold value of a time interval of each adjacent photographs block determined by said threshold value determining unit to determine a group boundary according to a result of the threshold processing.

6. The photograph grouping device according to claim 3, wherein the photographing density calculating unit calculates a photographing density as a superposition of window functions which are non-negative functions having a positive value within a fixed range centered on a photographing time of a photograph designated as a proximate photograph.

7. The photograph grouping device according to claim 6, wherein the window function is a function which attenuates as the function goes away from the origin.

8. The photograph grouping device according to claim 6, comprising:
a time width determining unit for determining a time width which defines a window width in the window function based on the time series photographing time information; wherein the photographing density calculating unit changes a window width in the window function according to a time width determined by said time width determining unit.

9. The photograph grouping device according to claim 1, comprising:
a photographing time interval calculating unit for calculating a time interval of each adjacent photographs block as a photographing time interval between photographs adjacent to each other in a group of photographs to be grouped based on the time series photographing time information indicative of a photographing time of each photograph included in the group of photographs to be grouped;
a proximate photograph designating unit for determining, with respect to each adjacent photographs block, one or a plurality of times in the adjacent photographs block as a determination time, and based on said time series photographing time information, designating, as a proximate photograph, a photograph satisfying predetermined constraint on a time distance between one or a plurality of times in the adjacent photographs block and a photographing time; and
a group boundary determining unit for detecting, with respect to each adjacent photographs block, by using a photographing time interval between photographs designated by said proximate photograph designating unit as a proximate photograph at one or a plurality of determination times in the adjacent photographs block, which time interval is obtained from a time interval of each adjacent photographs block calculated by said photographing time interval calculating unit, a change of a photographing disposition in the adjacent photographs block to determine whether there exists a group boundary between two photographs having each adjacent photographs block sandwiched therebetween.

10. The photograph grouping device according to claim 1, comprising:
a photographing time interval calculating unit for calculating a time interval of each adjacent photographs block as a photographing time interval between photographs adjacent to each other in a group of photographs to be grouped based on the time series photographing time information indicative of a photographing time of each photograph included in the group of photographs to be grouped;
a proximate photograph designating unit for determining, with respect to each adjacent photographs block, one or a plurality of times in the adjacent photographs block as a determination time, and based on a time interval of each adjacent photographs block calculated by said photographing time interval calculating unit, designating a photograph indicative of a photographing time satisfying constraint on a time distance from said determination time as a proximate photograph; and
a group boundary determining unit for detecting, with respect to each adjacent photographs block, by using a photographing time interval between photographs designated by said proximate photograph designating unit as a proximate photograph at one or a plurality of determination times in the adjacent photographs block, which time interval is obtained from a time interval of each adjacent photographs block calculated by said photographing time interval calculating unit, a change of a photographing disposition in the adjacent photographs block to determine whether there exists a group boundary between two photographs having each adjacent photographs block sandwiched therebetween.

11. The photograph grouping device according to claim 9, wherein the group boundary determining unit comprises:
a photographing density calculating unit for calculating, by using a photographing time interval between photographs designated as a proximate photograph at one or a plurality of determination times in each adjacent photographs block, a photographing density indicative of a degree of congestion of behavior of taking a photograph on a predetermined time region with each determination time as a reference; and
a minimum point detecting unit for detecting a minimum point by comparing photographing densities at the respective determination times calculated by said photographing density calculating unit to determine a group boundary based on a position of the detected minimum point in the time region.

12. The photograph grouping device according to claim 11, wherein the photographing density calculating unit calculates a photographing density as a reciprocal of an average value of a photographing time interval between photographs designated as a proximate photograph at a determination time.

13. The photograph grouping device according to claim 9, wherein the group boundary determining unit comprises:
an average photographing time interval calculating unit for calculating, by using a photographing time interval between photographs designated as a proximate photograph at one or a plurality of determination times in each adjacent photographs block, an average photographing time interval indicative of an average value of a photographing time interval between photographs taken in a predetermined time region with each determination time as a reference; and
a maximum point detecting unit for detecting a maximum point by comparing average photographing time intervals at the respective determination times calculated by said average photographing time interval calculating unit to determine a group boundary based on a position of the detected maximum point in the time region.

14. The photograph grouping device according to claim 9, wherein the group boundary determining unit comprises:
a threshold value determining unit for determining, with respect to each adjacent photographs block, a threshold value of a time interval of the adjacent photographs block by using a photographing time interval between photographs designated as a proximate photograph at one or a plurality of determination times in the adjacent photographs block; and
a threshold processing unit for executing threshold processing of a time interval of each adjacent photographs block by using a threshold value of a time interval of each adjacent photographs block determined by said threshold value determining unit to determine a group boundary according to a result of the threshold processing.

15. The photograph grouping device according to claim 1, wherein the proximate photograph designating unit designates a proximate photograph with time distance constraint that a time interval between a determination time in the adjacent photographs block and a photographing time is not more than a fixed value.

16. The photograph grouping device according to claim 15, comprising:
a time width determining unit for determining a time width in time distance constraint based on the time series photographing time information; wherein
the proximate photograph designating unit designates a proximate photograph with time distance constraint that a time interval between a determination time in the adjacent photographs block and a photographing time is not more than a fixed time indicated by a time width determined by said time width determining unit.

17. The photograph grouping device according to claim 16, wherein the time width determining unit includes
an event estimating unit for estimating a kind of event to be photographed based on the time series photographing time information, and
a time width calculating unit for calculating a time width which reflects a typical photographing pattern predicted according to a kind of each event based on a kind of event estimated by said event estimating unit.

18. The photograph grouping device according to claim 17, wherein the event estimating unit estimates a kind of event based on image data of each photograph or a photographing position of each photograph.

19. The photograph grouping device according to claim 17, wherein based on an event grading indicative of a scale of an event as a unit of grouping which is designated by a user, the time width calculating unit calculates a time width to be smaller as the event grading becomes finer and to be larger as the event grading becomes coarser.

20. A photograph grouping method of grouping photographs by determining whether there exists a group boundary between two photographs adjacent to each other in a group of photographs aligned in the order of photographing,
wherein a proximate photograph designating unit determines, with respect to each adjacent photographs block, which is a time block sandwiched between photographing times of two photographs adjacent to each other, one or a plurality of times in the adjacent photographs block as a determination time, and based on time series photographing time information indicative of a photographing time of each of the photographs to be grouped, designates, as proximate photographs, all photographs satisfying predetermined constraint on their time distance between said determination times and photographing time, and
a group boundary determining unit, with respect to each adjacent photographs block, by using photographing times of said proximate photographs or photographing time intervals between said proximate photographs, detects a change of a photographing disposition in the adjacent photographs block to determine whether there exists a group boundary between two photographs having each adjacent photographs block sandwiched therebetween.

21. The photograph grouping method according to claim 20, wherein the time distance constraint is that a time interval is not more than a fixed time.

22. The photograph grouping method according to claim 20, wherein the group boundary determining unit
by using a photographing time of a photograph designated as a proximate photograph at one or a plurality of determination times in each adjacent photographs block, calculates a photographing density indicative of a degree of congestion of behavior of taking a photograph on a predetermined time region with each determination time as a reference, and
detects a minimum point by comparing photographing densities at the respective determination times calculated to determine a group boundary based on a position of the detected minimum point in the time region.

23. The photograph grouping method according to claim 20, wherein the group boundary determining unit
by using a photographing time of a photograph designated as a proximate photograph at one or a plurality of determination times in each adjacent photographs block, calculates an average photographing time interval indicative of an average value of a photographing time interval between photographs taken in a predetermined time region with each determination time as a reference, and
detects a maximum point by comparing average photographing time intervals at the respective determination times calculated to determine a group boundary based on a position of the detected maximum point in the time region.

24. The photograph grouping method according to claim 20, wherein the group boundary determining unit
calculates a time interval of each adjacent photographs block as a photographing time interval between photographs adjacent to each other in a group of photographs to be grouped based on the time series photographing time information,
with respect to each adjacent photographs block, determines a threshold value of a time interval of the adjacent photographs block by using a photographing time interval between photographs designated as a proximate photograph at one or a plurality of determination times in the adjacent photographs block, which interval is obtained from said calculated time interval of each adjacent photographs block, and
executes threshold processing of a time interval of each adjacent photographs block by using the determined threshold value of a time interval of each adjacent photographs block to determine a group boundary according to a result of the threshold processing.

25. The photograph grouping method according to claim 24, wherein the group boundary determining unit calculates a photographing density as a superposition of window functions which are non-negative functions having a positive value within a fixed range centered on a photographing time of a photograph designated as a proximate photograph.

26. The photograph grouping method according to claim 25, wherein the window function is a function which attenuates as the function goes away from the origin.

27. The photograph grouping method according to claim 25, wherein
a time width determining unit determines a time width which defines a window width in the window function based on the time series photographing time information, and
the group boundary determining unit changes a window width in the window function according to the time width determined by said time width determining unit.

28. The photograph grouping method according to claim 20, wherein
a photographing time interval calculating unit calculates a time interval of each adjacent photographs block as a photographing time interval between photographs adjacent to each other in a group of photographs to be grouped based on the time series photographing time information indicative of a photographing time of each photograph included in the group of photographs to be grouped,
a proximate photograph designating unit determines, with respect to each adjacent photographs block, one or a plurality of times in the adjacent photographs block as a determination time, and based on said time series photographing time information, designates, as a proximate photograph, a photograph satisfying predetermined constraint on a time distance between one or a plurality of times in the adjacent photographs block and a photographing time, and a group boundary determining unit, with respect to each adjacent photographs block, by using a photographing time interval between photographs designated as a proximate photograph at one or a plurality of determination times in the adjacent photographs block, which time interval is obtained from said calculated time interval of each adjacent photographs block, detects a change of a photographing disposition in the adjacent photographs block to determine whether there exists a group boundary between two photographs having each adjacent photographs block sandwiched therebetween.

29. The photograph grouping method according to claim 20, wherein a photographing time interval calculating unit calculates a time interval of each adjacent photographs block as a photographing time interval between photographs adjacent to each other in a group of photographs to be grouped based on time series photographing time information indicative of a photographing time of each photograph included in the group of photographs to be grouped, a proximate photograph designating unit determines, with respect to each adjacent photographs block, one or a plurality of times in the adjacent photographs block as a determination time, and based on said calculated time interval of each adjacent photographs block; designates a photograph indicative of a photographing time satisfying constraint on a time distance from said determination time as a proximate photograph, and a group boundary determining unit, with respect to each adjacent photographs block, by using a photographing time interval between photographs designated as a proximate photograph at one or a plurality of determination times in the adjacent photographs block, which time interval is obtained from said calculated time interval of each adjacent photographs block, detects a change of a photographing disposition in the adjacent photographs block to determine whether there exists a group boundary between two photographs having each adjacent photographs block sandwiched therebetween.

30. The photograph grouping method according to claim 28, wherein the group boundary determining unit by using a photographing time interval between photographs designated as a proximate photograph at one or a plurality of determination times in each adjacent photographs block, calculates a photographing density indicative of a degree of congestion of behavior of taking a photograph on a predetermined time region with each determination time as a reference, and detects a minimum point by comparing the calculated photographing densities at the respective determination times to determine a group boundary based on a position of the detected minimum point in the time region.

31. The photograph grouping method according to claim 30, wherein the group boundary determining unit calculates a photographing density as a reciprocal of an average value of a photographing time interval between photographs designated as a proximate photograph at a determination time.

32. The photograph grouping method according to claim 28, wherein the group boundary determining unit by using a photographing time interval between photographs designated as a proximate photograph at one or a plurality of determination times in each adjacent photographs block, calculates an average photographing time interval indicative of an average value of a photographing time interval between photographs taken in a predetermined time region with each determination time as a reference, and detects a maximum point by comparing the calculated average photographing time intervals at the respective determination times to determine a group boundary based on a position of the detected maximum point in the time region.

33. The photograph grouping method according to claim 28, wherein the group boundary determining unit with respect to each adjacent photographs block, determines a threshold value of a time interval of the adjacent photographs block by using a photographing time interval between photographs designated as a proximate photograph at one or a plurality of determination times in the adjacent photographs block, and executes threshold processing of a time interval of each adjacent photographs block by using the determined threshold value of a time interval of each adjacent photographs block to determine a group boundary according to a result of the threshold processing.

34. The photograph grouping method according to claim 20, wherein the proximate photograph designating unit designates a proximate photograph with time distance constraint that a time interval between a determination time in the adjacent photographs block and a photographing time is not more than a fixed value.

35. The photograph grouping method according to claim 34, wherein the time width determining unit determines a time width in time distance constraint based on the time series photographing time information, and the proximate photograph designating unit designates a proximate photograph with the time distance constraint that a time interval between a determination time in the adjacent photographs block and a photographing time is not more than a fixed time indicated by said time width.

36. The photograph grouping method according to claim 35, wherein the time width determining unit estimates a kind of event to be photographed based on the time series photographing time information, and calculates a time width which reflects a typical photographing pattern predicted according to a kind of each event based on the estimated kind of event.

37. The photograph grouping method according to claim 36, wherein the time width determining unit estimates a kind of event based on image data of each photograph or a photographing position of each photograph.

38. The photograph grouping method according to claim 36, wherein based on an event grading indicative of a scale of an event as a unit of grouping which is designated by a user, the time width determining unit calculates a time width to be smaller as the event grading becomes finer and to be larger as the event grading becomes coarser.

39. A non-transitory computer-readable storage medium storing a photograph grouping program for grouping photographs by determining whether there exists a group boundary between two photographs adjacent to each other in a group of photographs aligned in the order of photographing, wherein said photograph grouping program causes a computer to execute the processing of:

with respect to each adjacent photographs block which is a time block sandwiched between photographing times of two photographs adjacent to each other, determining one or a plurality of times in the adjacent photographs block as a determination time, and based on time series photographing time information indicative of a photographing time of each of the photographs to be grouped, designating, as proximate photographs, all photographs satisfying predetermined constraint on their time distance between said determination times and a photographing time; and with respect to each adjacent photographs block, by using photographing times of said proximate photographs or photographing time intervals between said proximate photographs, detecting a change of a photographing disposition in the adjacent photographs block to determine whether there exists a group boundary between two photographs having each adjacent photographs block sandwiched therebetween.

40. The non-transitory computer-readable storage medium according to claim 39, wherein said photograph grouping program causes said computer to execute the processing of:

calculating a time interval of each adjacent photographs block as a photographing time interval between photographs adjacent to each other in a group of photographs to be grouped based on the time series photographing time information indicative of a photographing time of each photograph included in the group of photographs to be grouped;

with respect to each adjacent photographs block, determining one or a plurality of times in the adjacent photographs block as a determination time, and based on said time series photographing time information, designating, as a proximate photograph, a photograph satisfying predetermined constraint on a time distance between one or a plurality of times in the adjacent photographs block and a photographing time; and with respect to each adjacent photographs block, by using a photographing time interval between photographs designated as a proximate photograph at one or a plurality of determination times in the adjacent photographs block, which time interval is obtained from said calculated time interval of each adjacent photographs block, detecting a change of a photographing disposition in the adjacent photographs block to determine whether there exists a group boundary between two photographs having each adjacent photographs block sandwiched therebetween.

41. The non-transitory computer-readable storage medium according to claim 39, wherein said photograph grouping program causes said computer to execute the processing of:

calculating a time interval of each adjacent photographs block as a photographing time interval between photographs adjacent to each other in a group of photographs to be grouped based on time series photographing time information indicative of a photographing time of each photograph included in the group of photographs to be grouped;

with respect to each adjacent photographs block, determining one or a plurality of times in the adjacent photographs block as a determination time, and based on said calculated time interval of each adjacent photographs block, designating a photograph indicative of a photographing time satisfying constraint on a time distance from said determination time as a proximate photograph; and with respect to each adjacent photographs block, by using a photographing time interval between photographs designated as a proximate photograph at one or a plurality of determination times in the adjacent photographs block, which time interval is obtained from said calculated time interval of each adjacent photographs block, detecting a change of a photographing disposition in the adjacent photographs block to determine whether there exists a group boundary between two photographs having each adjacent photographs block sandwiched therebetween.

* * * * *